United States Patent
Hayashi et al.

(10) Patent No.: US 9,881,362 B2
(45) Date of Patent: Jan. 30, 2018

(54) IMAGE PROCESSING DEVICE, IMAGE-CAPTURING DEVICE, IMAGE PROCESSING METHOD, AND PROGRAM

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 221 days.

(21) Appl. No.: 14/933,759

(22) Filed: Nov. 5, 2015

(65) Prior Publication Data

US 2016/0055628 A1 Feb. 25, 2016

Related U.S. Application Data

(63) Continuation of application No. PCT/JP2014/059163, filed on Mar. 28, 2014.

(30) Foreign Application Priority Data

May 13, 2013 (JP) .................................. 2013-101485

(51) Int. Cl.
  *G06K 9/40* (2006.01)
  *G06T 5/00* (2006.01)
  (Continued)

(52) U.S. Cl.
  CPC ......... *G06T 5/003* (2013.01); *H04N 5/23212* (2013.01); *H04N 5/3572* (2013.01);
  (Continued)

(58) Field of Classification Search
  CPC ........... G06T 5/003; G06T 2207/20024; G06T 2207/20201; H04N 5/23212; H04N 5/3572; H04N 9/045
  See application file for complete search history.

(56) References Cited

U.S. PATENT DOCUMENTS

2003/0184663 A1\* 10/2003 Nakano ................ H04N 1/4092
  348/241
2007/0242142 A1\* 10/2007 Okazaki ................ G03B 13/18
  348/239

(Continued)

FOREIGN PATENT DOCUMENTS

JP   2004-205802 A   7/2004
JP   2009-77202 A    4/2009
(Continued)

OTHER PUBLICATIONS

International Search Report, issued in PCT/JP2014/059163, dated Jun. 24, 2014.

(Continued)

*Primary Examiner* — Jonathan S Lee
(74) *Attorney, Agent, or Firm* — Birch, Stewart, Kolasch & Birch, LLP

(57) ABSTRACT

An image processing device includes a point-image restoration processing unit 40 which receives a photographic image as input, and subjects the photographic image to a point-image restoration process based on point-image restoration information to generate a restored image, an area information output unit 45 which outputs area information relating to a specific area in the restored image where restoration strength of the point-image restoration process based on the point-image restoration information is equal to or greater than a threshold value, a display control unit 50 which receives the restored image and the area information as input and performs display control to highlight the specific area in the restored image based on the area information, and a display unit 55 which highlights at least the specific area based on the display control by the display control unit 50.

18 Claims, 26 Drawing Sheets

(51) Int. Cl.
*H04N 5/232* (2006.01)
*H04N 5/357* (2011.01)
*H04N 9/04* (2006.01)

(52) U.S. Cl.
CPC ... *H04N 9/045* (2013.01); *G06T 2207/20024* (2013.01); *G06T 2207/20201* (2013.01)

(56) References Cited

U.S. PATENT DOCUMENTS

| | | | |
|---|---|---|---|
| 2009/0080790 A1 | 3/2009 | Hasegawa | |
| 2009/0225202 A1 | 9/2009 | Hata | |
| 2010/0157127 A1* | 6/2010 | Takayanagi | H04N 5/23293 348/333.02 |
| 2011/0149103 A1* | 6/2011 | Hatakeyama | G06T 5/003 348/222.1 |
| 2012/0076362 A1* | 3/2012 | Kane | G06T 5/003 382/106 |
| 2015/0379695 A1* | 12/2015 | Naruse | H04N 1/409 348/234 |
| 2016/0098819 A1* | 4/2016 | Sugimoto | H04N 5/23206 382/260 |
| 2017/0024866 A1* | 1/2017 | Watanabe | G06T 5/003 |
| 2017/0053387 A1* | 2/2017 | Watanabe | G06T 5/003 |
| 2017/0069064 A1* | 3/2017 | Sugimoto | G06K 9/522 |

FOREIGN PATENT DOCUMENTS

| | | |
|---|---|---|
| JP | 2009-213044 A | 9/2009 |
| JP | 2011-193277 A | 9/2011 |

OTHER PUBLICATIONS

Written Opinion of the International Searching Authority, issued in PCT/JP2014/059163, dated Jun. 24, 2014.

* cited by examiner

HIGHLIGHT 1

HIGHLIGHT 2

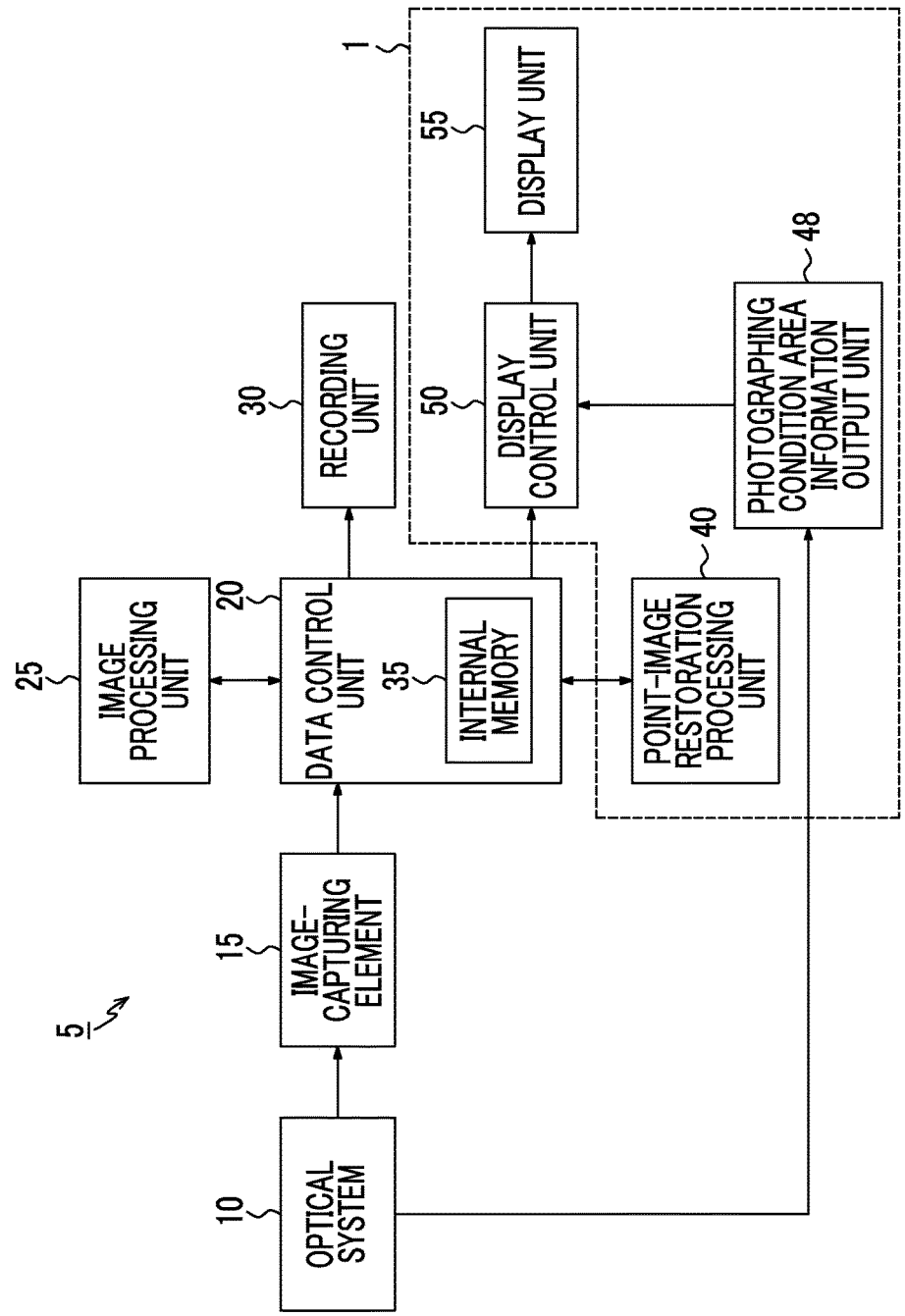

IMAGE PROCESSING DEVICE, IMAGE-CAPTURING DEVICE, IMAGE PROCESSING METHOD, AND PROGRAM

CROSS-REFERENCE TO RELATED APPLICATIONS

This application is a Continuation of PCT International Application No. PCT/JP2014/059163 filed on Mar. 28, 2014, which claims priority under 35 U.S.C §119(a) to Japanese Patent Application No. 2013-101485 filed May 13, 2013. Each of the above application(s) is hereby expressly incorporated by reference, in its entirety, into the present application.

BACKGROUND OF THE INVENTION

1. Field of the Invention

The present invention relates to a technique for an image processing device, and in particular, a technique for display of an image subjected to correction based on a point spread function (PSF).

2. Description of the Related Art

Image deterioration or diffraction blur resulting from various types of aberration for an optical system (photographing lens and the like) may occur in a photographic image obtained by photographing an object by an image-capturing device, such as a digital camera.

In order to prevent image deterioration or diffraction blur (peripheral blur, chromatic aberration of magnification, or the like) resulting from aberration, a technique which subjects image data of an object image to an image process to remove (correct) image deterioration or diffraction blur has been considered.

Image deterioration due to aberration can be expressed by a point spread function (PSF), and image quality can be recovered by subjecting a photographic image with deteriorated image quality to a point-image restoration process based on the point spread function. That is, the point-image restoration process is a process for applying a restoration filter (reverse filter) of the point spread function to photographic image data to cancel image deterioration.

When correcting a photographed photographic image, various techniques for confirming the effect of the correction have been considered.

For example, JP2009-213044A discloses a technique which compares and displays an image after image shake correction and an image before image shake correction.

JP2004-205802A discloses a technique which displays a shaking image before a recovery process and a recovered image after a recovery process, information relating to a point function (considered to correspond to a point spread function of this application), and shake locus data in association with one another.

JP2009-77202A discloses a technique which displays an image to be corrected (an image before correction) and an image after correction, evaluates the degree of restoration of the target image to determine the degree of blurring, and further uses the determination for correction.

JP2011-193277A discloses a technique which displays an area where the difference between images before and after a recovery process (considered to correspond to a point-image restoration process of this application) is maximized, and confirms the effect of the recovery process.

SUMMARY OF THE INVENTION

However, in the techniques described in JP2009-213044A, JP2004-205802A, and JP2009-77202A, it may not be possible to appropriately confirm the effect of the point-image restoration process for the photographic image. That is, when confirming the effect of the point-image restoration process, it may be difficult for the user to visually confirm the effect simply by arranging and displaying a photographic image before a point-image restoration process and a photographic image after a point-image restoration process. In the technique described in JP2011-193277A, when there is noise or the like (saturated pixel or the like) in a photographic image before a point-image restoration process, it may not be possible to appropriately confirm the effect of the point-image restoration process (whether an image is improved by the point-image restoration process or is affected by noise or the like and deteriorated).

The invention has been accomplished in consideration of such a situation, and an object of the invention is to provide an image processing device, an image-capturing device, an image processing method, and a non-transitory computer readable recording medium storing a program capable of easily confirming the effect of a point-image restoration process, and even when there is noise or the like (saturated pixel or the like) in a photographic image before the point-image restoration process, appropriately confirming the effect of the point-image restoration process.

In order to attain the above-described object, an image processing device according to an aspect of the invention includes a point-image restoration processing unit which receives a photographic image as input, and subjects the photographic image to a point-image restoration process based on point-image restoration information to generate a restored image, an area information output unit which outputs area information relating to a specific area in the restored image where the restoration strength of the point-image restoration process based on the point-image restoration information is equal to or greater than a threshold value, a display control unit which receives the restored image and the area information as input and performs display control to highlight the specific area in the restored image based on the area information, and a display unit which highlights at least the specific area based on the display control by the display control unit.

With this, it is possible to easily confirm the effect of the point-image restoration process by highlighting the specific area. In addition, even when there is noise or the like (saturated pixel or the like) in a photographic image before the point-image restoration process, the specific area is specified by the restoration strength; therefore, it is possible to appropriately confirm the effect of the point-image restoration process (whether an image is improved by the point-image restoration process or is affected by noise or the like and deteriorated).

In the image processing device, preferably, the area information output unit selects, as the specific area, an area in the restored image where an increase rate of a modulation transfer function based on the point-image restoration information is equal to or greater than a threshold value.

With this, it is possible to more accurately select the specific area and to highlight the accurately selected specific area; therefore, it is possible to appropriately confirm the effect of the point-image restoration process.

An image processing device preferably includes a filter area information output unit instead of the area information output unit, the filter area information output unit receives information relating to a restoration filter of the point-image restoration process as input and outputs filter area information relating to the specific area in the restored image based on information relating to the restoration filter, and the display control unit receives the filter area information instead of the area information as input and performs display control to highlight the specific area in the restored image based on the filter area information.

With this, it is possible to highlight the specific area based on the filter area information and to appropriately confirm the effect of the point-image restoration process.

An image processing device preferably includes an analysis area information generation unit instead of the area information output unit, the analysis area information generation unit receives the photographic image as input, analyzes and specifies an area where a false signal is likely to occur in the photographic image, and generates analysis area information for setting the area as the specific area, and the display control unit receives the analysis area information instead of the area information as input and performs display control to highlight the specific area in the restored image based on the analysis area information.

With this, it is possible to highlight the specific area based on the analysis area information and to appropriately confirm the effect of the point-image restoration process.

An image processing device preferably includes a photographing condition area information output unit instead of the area information output unit, the photographing condition area information output unit receives information relating to photographing conditions of the photographic image as input and outputs photographing condition area information relating to the specific area in the photographic image based on information relating to the photographing conditions, and the display control unit receives the photographing condition area information instead of the area information as input and performs display control to highlight the specific area in the restored image based on the photographing condition area information.

With this, it is possible to highlight the specific area based on the photographing condition area information and to appropriately confirm the effect of the point-image restoration process.

In the image processing device, preferably, the photographing condition area information output unit outputs the photographing condition area information relating to the specific area in the photographic image based on at least one of an F value, a photographing distance, a focal distance, a zoom position, and a lens type.

With this, it is possible to highlight the specific area based on the photographing condition area information based on the F value, the photographing distance, the focal distance, the zoom position, and the lens type and to appropriately confirm the effect of the point-image restoration process.

In the image processing device, preferably, the display control unit performs display control to highlight the specific area in the restored image in a plurality of display forms, and a display order of the plurality of display forms is determined based on information relating to the specific area.

With this, it is possible to confirm a plurality of highlighted specific areas in a descending order of the effect of the point-image restoration process and to appropriately confirm the effect of the point-image restoration process.

In the image processing device, preferably, the display control unit performs display control to highlight a central area of the restored image when there is no specific area, and the display unit highlights the central area of the restored image based on the display control by the display control unit.

With this, it is possible to confirm the effect of the point-image restoration process relating to a main object.

In the image processing device, preferably, the display control unit performs display control to display the specific area in the restored image and the restored image, and the display unit displays the specific area in the restored image and the restored image based on the display control by the display control unit.

With this, it is possible to confirm the effect of the point-image restoration process for the specific area having a great effect of the point-image restoration process and the entire restored image.

In the image processing device, preferably, the display control unit performs display control to compare and display the photographic image and the restored image or the specific area in the restored image and an area in the photographic image corresponding to the specific area, the display unit compares and displays the photographic image and the restored image or the specific area in the restored image and an area in the photographic image corresponding to the specific area based on the display control by the display control unit, and the point-image restoration processing unit subjects the photographic image to the point-image restoration process based on a selected image of the compared and displayed images or a selected area of the compared and displayed areas.

With this, the point-image restoration process is executed based on the selected image or the selected area; therefore, it is possible to perform the point-image restoration process matching a user's preference.

In the image processing device, preferably, the display control unit performs display control to highlight a location corresponding to an image height at which the specific area is included.

With this, highlighting is performed at the image height at which the specific area is included; therefore, it is possible to appropriately confirm the effect of the point-image restoration process.

In order to attain the above-described object, an image-capturing device according to another aspect of the invention has the above-described image processing device. The image-capturing device is preferably a lens interchangeable type. In addition, the image-capturing device preferably has a lens which modulates a phase to extend a depth of field.

In order to attain the above-described object, an image processing device according to still another aspect of the invention includes an input unit which receives, as input, a restored image obtained by subjecting a photographic image to a point-image restoration process based on point-image restoration information and area information relating to a specific area in the restored image where the restoration strength of the point-image restoration process based on the point-image restoration information is equal to or greater than a threshold value, a display control unit which receives the restored image and the area information as input and performs display control to highlight the specific area in the restored image based on the area information, and a display unit which highlights at least the specific area based on the display control by the display control unit.

With this, it is possible to perform highlighting in a restored image subjected to the point-image restoration process in another device and to appropriately confirm the effect of the point-image restoration process.

In order to attain the above-described object, an image processing method according to still another aspect of the invention includes a point-image restoration processing step of subjecting a photographic image to a point-image restoration process based on point-image restoration information and generating a restored image, an area information output step of outputting area information relating to a specific area in the restored image where the restoration strength of the point-image restoration process based on the point-image restoration information is equal to or greater than a threshold value, a display control step of performing display control to highlight the specific area in the restored image based on the area information, and a display step of highlighting at least the specific area based on the display control in the display control step.

With this, it is possible to easily confirm the effect of the point-image restoration process by highlighting the specific area, and even when there is noise or the like (saturated pixel or the like) in a photographic image before the point-image restoration process, since the specific area is specified by the restoration strength, it is possible to appropriately confirm the effect of the point-image restoration process.

An image processing method preferably includes a filter area information output step instead of the area information output step, in the filter area information output step, filter area information relating to the specific area in the restored image is output based on information relating to a restoration filter of the point-image restoration process, and in the display control step, display control is performed to highlight the specific area in the restored image based on the filter area information.

With this, it is possible to highlight the specific area based on the filter area information and to appropriately confirm the effect of the point-image restoration process.

An image processing method preferably includes an analysis area information generation step instead of the area information output step, in the analysis area information generation step, an area where a false signal is likely to occur in the photographic image is analyzed and specified, and analysis area information for setting the area as the specific area is generated, and in the display control step, display control is performed to highlight the specific area in the restored image based on the analysis area information.

With this, it is possible to highlight the specific area based on the analysis area information and to appropriately confirm the effect of the point-image restoration process.

An image processing method preferably includes a photographing condition area information output step instead of the area information output step, in the photographing condition area information output step, photographing condition area information relating to the specific area in the photographic image is output based on information relating to the photographing conditions of the photographic image, and in the display control step, display control is performed to highlight the specific area in the restored image based on the photographing condition area information.

With this, it is possible to highlight the specific area based on the photographing condition area information and to appropriately confirm the effect of the point-image restoration process.

In order to attain the above-described object, an image processing method according to still another aspect of the invention includes an acquisition step of acquiring a restored image obtained by subjecting a photographic image to a point-image restoration process based on point-image restoration information and area information relating to a specific area in the restored image where the restoration strength of the point-image restoration process based on the point-image restoration information is equal to or greater than a threshold value, a display control step of receiving the restored image and the area information as input and performing display control to highlight the specific area in the restored image based on the area information, and a display step of highlighting at least the specific area based on the display control in the display control step.

With this, it is possible to perform highlighting in a restored image subjected to the point-image restoration process in another device and to appropriately confirm the effect of the point-image restoration process.

In order to attain the above-described object, non-transitory computer readable recording medium storing a program according to still another aspect of the invention causes a computer to execute a point-image restoration processing step of subjecting a photographic image to a point-image restoration process based on point-image restoration information and generating a restored image, an area information output step of outputting area information relating to a specific area in the restored image where the restoration strength of the point-image restoration process based on the point-image restoration information is equal to or greater than a threshold value, a display control step of performing display control to highlight the specific area in the restored image based on the area information, and a display step of highlighting at least the specific area based on the display control in the display control step.

With this, it is possible to easily confirm the effect of the point-image restoration process by highlighting the specific area, and even when there is noise or the like (saturated pixel or the like) in a photographic image before the point-image restoration process, since the specific area is specified by the restoration strength, it is possible to appropriately confirm the effect of the point-image restoration process.

A program preferably includes a filter area information output step instead of the area information output step, in the filter area information output step, filter area information relating to the specific area in the restored image is output based on information relating to a restoration filter of the point-image restoration process, and in the display control step, display control is performed to highlight the specific area in the restored image based on the filter area information.

With this, it is possible to highlight the specific area based on the filter area information and to appropriately confirm the effect of the point-image restoration process.

A program preferably includes an analysis area information generation step instead of the area information output step, in the analysis area information generation step, an area where a false signal is likely to occur in the photographic image is analyzed and specified, and analysis area information for setting the area as the specific area is generated, and in the display control step, display control is performed to highlight the specific area in the restored image based on the analysis area information.

With this, it is possible to highlight the specific area based on the analysis area information and to appropriately confirm the effect of the point-image restoration process.

A program preferably includes a photographing condition area information output step instead of the area information output step, in the photographing condition area information output step, photographing condition area information relating to the specific area in the photographic image is output based on information relating to the photographing conditions of the photographic image, and in the display control step, display control is performed to highlight the specific area in the restored image based on the photographing condition area information.

With this, it is possible to highlight the specific area based on the photographing condition area information and to appropriately confirm the effect of the point-image restoration process.

In order to attain the above-described object, a non-transitory computer readable recording medium storing a program according to still another aspect of the invention causes a computer to execute an acquisition step of acquiring a restored image obtained by subjecting a photographic image to a point-image restoration process based on point-image restoration information and area information relating to a specific area in the restored image where the restoration strength of the point-image restoration process based on the point-image restoration information is equal to or greater than a threshold value, a display control step of receiving the restored image and the area information as input and performing display control to highlight the specific area in the restored image based on the area information, and a display step of highlighting at least the specific area based on the display control in the display control step.

With this, it is possible to perform highlighting in a restored image subjected to the point-image restoration process in another device and to appropriately confirm the effect of the point-image restoration process.

According to the invention, the specific area is highlighted, whereby it is possible to easily confirm the effect of the point-image restoration process, and even when there is noise or the like (saturated pixel or the like) in a photographic image before the point-image restoration process, it is possible to appropriately confirm the effect of the point-image restoration process (whether an image is improved by the point-image restoration process or is affected by noise or the like and deteriorated).

BRIEF DESCRIPTION OF THE DRAWINGS

FIG. 16 is a block diagram showing main parts of an image-capturing device including a modification example of an image processing device.

DESCRIPTION OF THE PREFERRED EMBODIMENTS

An embodiment of the invention will be described referring to the accompanying drawings. The following description is the description of an example relating to the invention, and is not intended to limit the invention.

Figure 1:
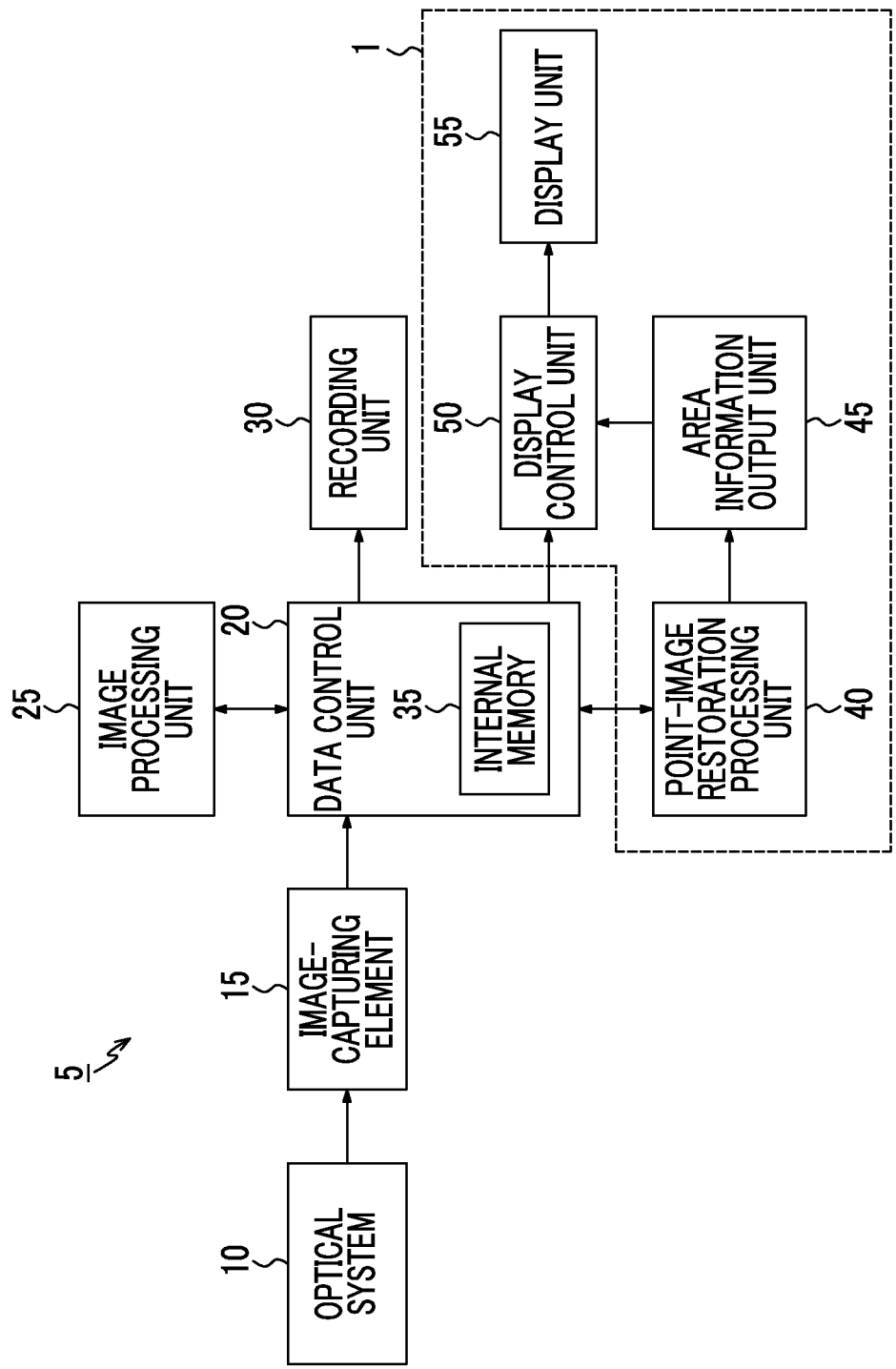
FIG. 1 is a block diagram showing main parts of an image-capturing device including an image processing device.

FIG. 1 shows a case where an image processing device 1 of the invention is included in an image-capturing device 5, and is a block diagram of main parts of the image-capturing device. The image-capturing device 5 shown in FIG. 1 primarily includes an optical system 10, an image-capturing element 15, a data control unit 20, an image processing unit 25, an internal memory 35, a recording unit 30, and the image processing device 1 of the invention. In addition, the image processing device 1 primarily includes a point-image restoration processing unit 40, an area information output unit 45, a display control unit 50, and a display unit 55.

The image-capturing device 5 can record a captured photographic image in the internal memory 35 provided in the data control unit or the recording unit 30, and the operation of the entire device is integrally controlled by a central processing unit (CPU) (not shown).

The optical system 10 in FIG. 1 primarily means a lens unit and a shutter. The lens unit includes a focus lens, a zoom lens, a diaphragm, and the like, and a light flux passing through the lens unit and the shutter is imaged on the light receiving surface of the image-capturing element 15. The lens unit of the optical system 10 may be a lens interchangeable type or a non-interchangeable type. The lens unit of the optical system 10 may modulate a phase to extend a depth of field.

The image-capturing element 15 has multiple light-receiving elements (photodiodes) in a two-dimensional array, and an object image formed on the light receiving surface of each photodiode is converted to a signal voltage (or electric charge) in an amount according to the amount of incident light.

A color filter used in the image-capturing element 15 can use various arrays (color filter arrays), and is not particularly limited. For example, the image-capturing element 15 can use a Bayer array.

A signal charge accumulated in the image-capturing element 15 is read as a voltage signal according to the signal charge. The voltage signal read from the image-capturing element 15 is applied to an A/D converter and sequentially converted to digital R (red), G (green), and B (blue) signals corresponding to the color filter array, and the digital R, and B signals are stored in the internal memory 35 in the data control unit.

The internal memory 35 includes a SDRAM which is a volatile memory or an EEPROM which is a rewritable nonvolatile memory, and the like, and the SDRAM is used as a work area when the CPU executes a program or a storage area which temporarily stores a captured and acquired digital image signal. The EEPROM stores a camera control program including an image processing program, defect information of pixels of the image-capturing element 15, various parameters or tables for use in an image process, and the like.

The image processing unit 25 subjects a digital image signal temporarily stored in the internal memory 35 to signal processes, such as white balance correction, a gamma correction process, a demosaic process (also referred to as a synchronization process), RGB/YC conversion, contour correction, chromatic aberration correction, and a point-image restoration process. In the invention, the order of the signal processes is not particularly limited. The image signal (image data) subjected to the signal process in the image processing unit 25 is returned to the data control unit 20 again and stored in the internal memory 35.

The image signal (image data) processed by the image processing unit 25 is encoded to data for image display in the display control unit 50 and output to the display unit 55 in the image-capturing device 5 through a driver. With this, the object image is continuously displayed on the display screen of the display unit 55.

If there is depression (half depression) on a first stage of a shutter button in the image-capturing device 5, the CPU receives a preliminary photographing instruction signal output according to the depression (half depression) on the first stage, starts an AF operation and an AE operation, moves the focus lens of the lens unit in the optical system in an optical axis direction, and performs controls such that the focus lens is at an in-focus position.

The CPU receives a preliminary photographing instruction signal output by the half depression of the shutter button, calculates brightness of the object based on image data output from the A/D converter, and determines exposure conditions. The timing of the determination of the exposure conditions is not limited to at the half depression of the shutter button.

The AE operation and the AF operation end, and if there is depression (full depression) on a second stage of the shutter button, main photographing is performed while controlling the diaphragm, the shutter, and the electric charge accumulation time in the image-capturing element 15 according to the determined exposure conditions. Image data of an RGB mosaic image (image corresponding to color filter array) read from the image-capturing element 15 at the main photographing and A/D converted by the A/D converter is temporarily stored in the internal memory 35.

Image data temporarily stored in the internal memory 35 is appropriately read by the image processing unit 25 and subjected to a predetermined signal process including white balance correction, gamma correction, a demosaic process (synchronization process), RGB/YC conversion, contour correction, color correction, and the like. Image data (YC data) subjected to RGB/YC conversion is compressed according to a predetermined compression format (for example, JPEG format), and compressed image data is recorded in the internal memory 35 or an external memory in the recording unit 30 in a predetermined image file (for example, Exif file) format.

The image processing device 1 shown in FIG. 1 is provided with the point-image restoration processing unit 40. In the point-image restoration processing unit 40, a photographic image is input, a photographic image is subjected to the point-image restoration process based on point-image restoration information, and a restored image is generated.

In the area information output unit 45, area information relating to a specific area in the restored image where the restoration strength of the point-image restoration process based on the point-image restoration information is equal to or greater than a threshold value is output. The details of the point-image restoration processing unit 40 and the area information output unit 45 will be described below. In FIG. 1, although the point-image restoration processing unit 40 is provided separately from the image processing unit 25 in the image-capturing device 5, the invention is not limited thereto. For example, the point-image restoration processing unit 40 may be provided in the image processing unit 25. That is, the image processing unit 25 may be provided in the image processing device 1, and the point-image restoration processing unit 40 may be provided in the image processing unit.

The display control unit 50 displays the restored image and/or the photographic image sent from the data control unit 20 through the driver on the display unit 55. Furthermore, the area information is input, and display control is performed to highlight the specific area in the restored image based on the area information.

The display unit 55 displays the restored image sent from the display control unit 50. Furthermore, the display unit 55 highlights at least the specific area based on the display control by the display control unit 50. As a specific example of the display unit 55, as shown in FIG. 1, when the image-capturing device 5 includes the display unit 55, a liquid crystal screen or the like provided on the rear surface of the image-capturing device 5 is considered. When the image processing device 1 is provided in a computer, a monitor or the like of the computer is given as a specific example of the display unit 55.

Next, the point-image restoration process which is performed by the point-image restoration processing unit 40 (see FIG. 1) will be described referring to the FIGS. 2 and 3. In the point-image restoration processing unit 40, the photographic image is subjected to the point-image restoration process based on the point-image restoration information, and the restored image is generated. The point-image restoration information is not particularly limited as long as the point-image restoration information determines the processing content of the point-image restoration process. For example, various parameters determining the processing content of the point-image restoration process are point-image restoration information. For example, a filter coefficient and the number of taps of the filter may be point-image restoration information.

Figure 2:
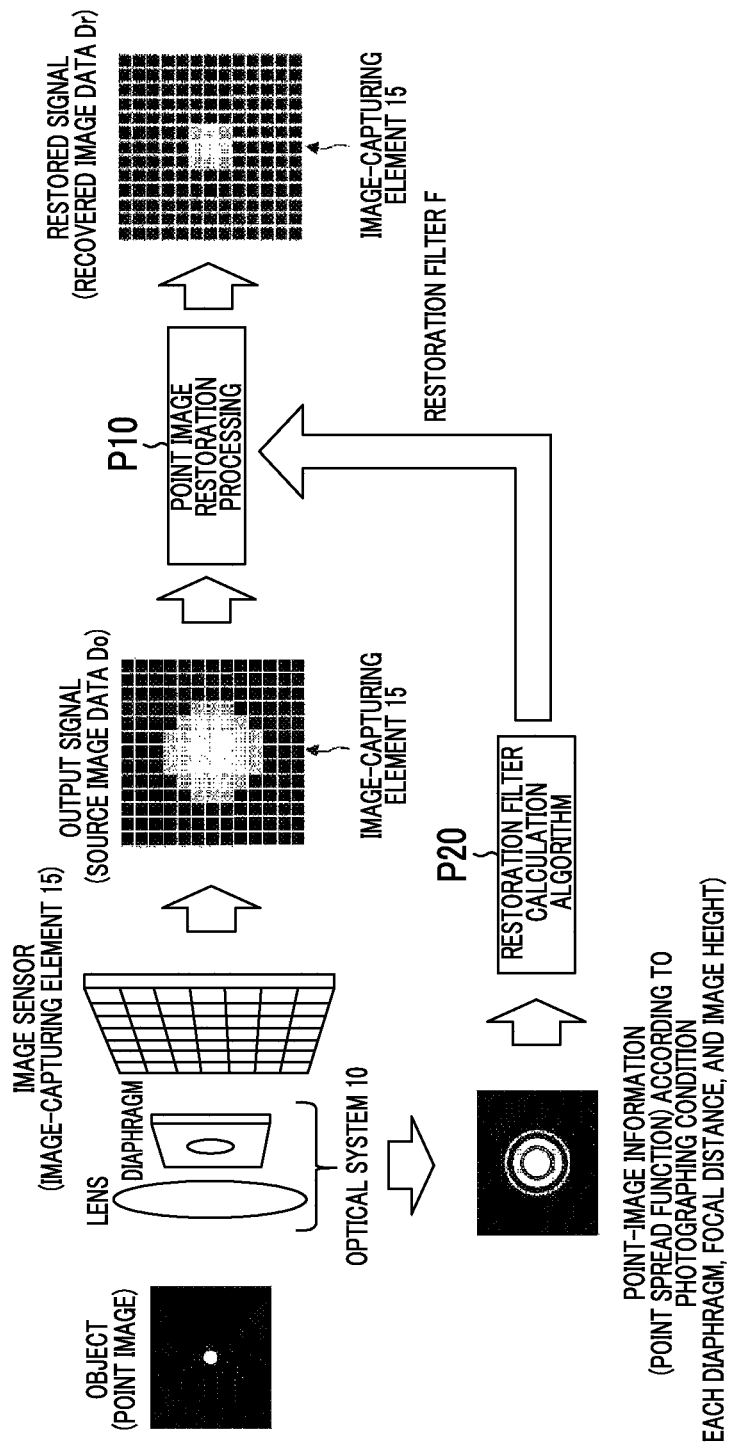
FIG. 2 is a diagram illustrating a point-image restoration process.
Figure 3:
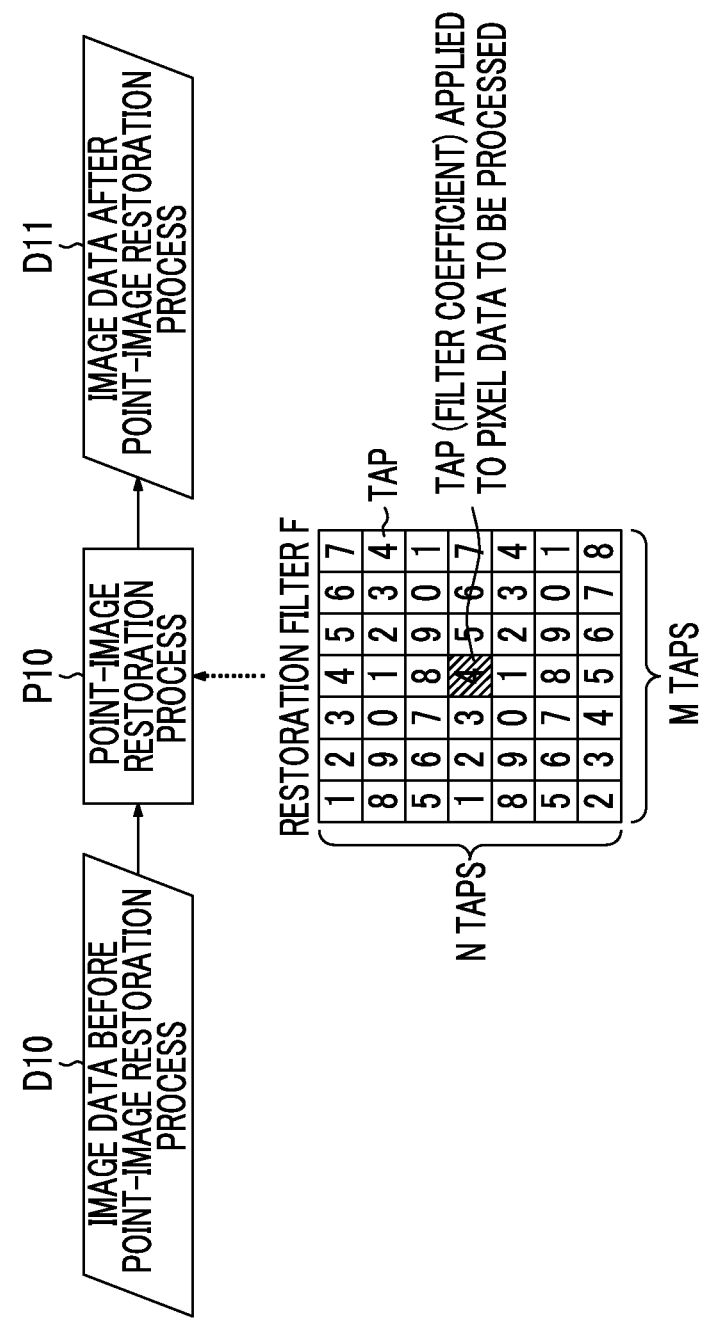
FIG. 3 is a diagram illustrating the point-image restoration process.

FIG. 2 is a diagram showing an outline from image capturing to the point-image restoration process. When a point image as an object is photographed, an object image is received by the image-capturing element 15 (image sensor) through the optical system 10 (lens, diaphragm, and the like), and source image data Do (photographic image) is output from the image-capturing element 15. Source image data Do becomes image data, in which an original object image is blurred, by a point spread phenomenon resulting from the characteristics of the optical system 10.

In order to restore an original object image (point image) from source image data Do of the blurred image, the point-image restoration processing unit 40 subjects source image data Do to a point-image restoration process P10 using a restoration filter F, whereby recovered image data Dr representing an image (restored image) closer to the original object image (point image) is obtained.

The restoration filter F used for the point-image restoration process P10 in the point-image restoration processing unit 40 is obtained from point-image information (point spread function) of the optical system 10 according to photographing conditions at the time of acquisition of source image data Do by a predetermined restoration filter calculation algorithm P20. The point-image information (point spread function) of the optical system 10 fluctuates depending on various photographing conditions, such as a diaphragm amount, a focal distance, a zoom amount, an image height, the number of recording pixels, and a pixel pitch, as well as the type of lens; therefore, when calculating the restoration filter F, these photographing conditions are acquired.

The outline of the point-image restoration process which is performed by the point-image restoration processing unit 40 (see FIG. 1) will be described referring to FIG. 3. FIG. 3 is a block diagram showing the outline of an example of the point-image restoration process. The point-image restoration process P10 is a process for creating image data D11 (restored image) after the point-image restoration process from image data D10 (photographic image) before the point-image restoration process by a filtering process using the restoration filter F. That is, the restoration filter F constituted of N×M taps is applied to image data to be processed, and weighted average calculation of a filter coefficient allocated to each tap and corresponding pixel data (pixel data to be processed of image data D10 before the point-image restoration process and adjacent pixel data) is performed, whereby pixel data (image data D11 after the point-image restoration process) after the point-image restoration process can be calculated. The weighted average process using the restoration filter F is applied to all pixel data constituting image data while changing a target pixel in order, thereby performing the point-image restoration process.

Next, in the area information output unit 45, information relating to the specific area in the restored image is output. That is, the point-image restoration information is acquired from the point-image restoration processing unit 40, and the area information relating to the specific area in the restored image where the restoration strength of the point-image restoration process is equal to or greater than the threshold value is output. The expression "the restoration strength is equal to or greater than the threshold value" means that the point-image restoration process strongly acts on the photographic image. In other words, the expression "the restoration strength is equal to or greater than the threshold value" means that the degree of restoration (correction) of the photographic image by the point-image restoration process is equal to or greater than a certain degree.

In the area information output unit 45, information relating to the specific area in the restored image where the restoration strength is equal to or greater than the threshold value is output based on information set in advance regarding the content of the point-image restoration process, whereby it is possible to appropriately confirm the effect of the point-image restoration process.

Figure 4:
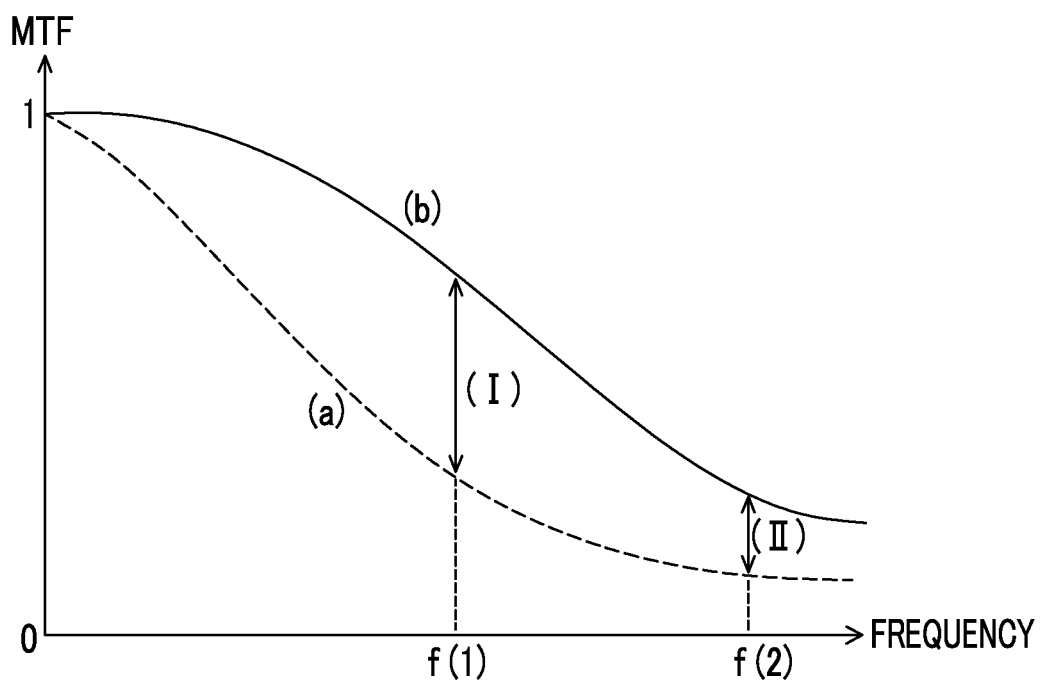
FIG. 4 is a diagram illustrating the effect of the point-image restoration process.

In FIG. 4, the restoration of the photographic image by the point-image restoration process will be described using a modulation transfer function (MTF). (a) of FIG. 4 indicates an MTF of the photographic image (image before point-image restoration process), and (b) of FIG. 4 indicates an MTF of the restored image (image after point-image restoration process). (I) and (II) of FIG. 4 indicate an increase of the modulation transfer function based on the point-image restoration information.

An optical transfer function (OTF) which is obtained by Fourier transform of a point spread function (PSF) is frequency component information of aberration and is represented by a complex number. The absolute value of the optical transfer function (OTF), that is, an amplitude component is referred to as an MTF, and a phase component is referred to as a phase transfer function (PTF). The MTF and the PTF are respectively the frequency characteristics of the amplitude component and the phase component of image deterioration due to aberration.

Since the point-image restoration process corrects the MTF and/or the PTF so as to approach an ideal response, even if an image has a PSF which is unclear before the point-image restoration process, the restored image after the point-image restoration process becomes clear.

As shown in FIG. 4, an area in the restored image where an increase rate of the modulation transfer function (the value of the MTF) at a frequency f(1) based on the point-image restoration information is equal to or greater than a threshold value is selected as a specific area. That is, the MTF of the photographic image (image before point-image restoration process) indicated by (a) of FIG. 4 becomes a curve indicated by (b) of FIG. 4 by performing the point-image restoration process. Where the frequency is f(1), the MTF indicated by (a) is raised to the MTF indicated by (b) with the point-image restoration process (see (I) in FIG. 4). The increase rate indicated by (I) in FIG. 4 can be referred to as a great increase rate in consideration of the entire graph shown in FIG. 4. Where the frequency is f(2), the MTF indicated by (a) is raised to the MTF indicated by (b) with the point-image restoration process (see (II) in FIG. 4). The increase rate indicated by (II) in FIG. 4 is a small increase rate in consideration of the entire graph shown in FIG. 4. The frequencies f(1) and f(2) are not limited to a specific frequency. For example, a case where a frequency (0.25 Fs) which is half the Nyquist frequency can be used as f(1), and 0.4 Fs can be used as f(2) is considered. Although the increase rate indicated by (I) in FIG. 4 is expressed such that the increase rate of the MTF with the point-image restoration process is great, specifically, a case where the increase rate has a value equal to or greater than 25% of the maximum value of the MTF, preferably, equal to or greater than 35% is considered. Although the increase rate indicated by (II) in FIG. 4 is expressed such that the increase rate of the MTF with the point-image restoration process is small, specifically, a case where the increase rate has a value equal to or less than 15% of the maximum value of the MTF, preferably, equal to or less than 10% is considered. In this example, the magnitude of the difference in the MTF before and after the point-image restoration process is referred to as restoration strength. In addition, the restoration strength is determined by the restoration filter. Here, Fs means a sampling frequency.

In the area information output unit 45, an area where the restoration strength of the point-image restoration process described above is equal to or greater than the threshold value is specified as a specific area, and is output as area information. The output area information is input to the display control unit 50 along with the restored image. The specific area is highlighted based on the area information. A display form of highlighting is not particularly limited, and various forms can be used from the viewpoint of facilitating the user to confirm the effect of the point-image restoration process (whether an image is improved by the point-image restoration process or is affected by noise or the like and deteriorated). Hereinafter, a specific form of highlighting will be described.

[Form of Highlighting]

FIGS. 5 to 9 show a specific example of display control to highlight a specific area 110 in the display control unit 50 and highlighting of the specific area 110 in the display unit 55. Highlighting may be performed such that the user can appropriately confirm the effect of the point-image restoration process, and is not particularly limited.

Figure 5A:
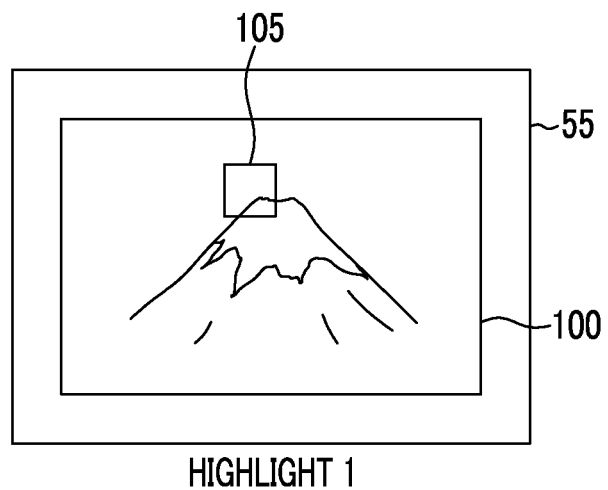
FIGS. 5A and 5B are diagrams illustrating highlighting.
Figure 5B:
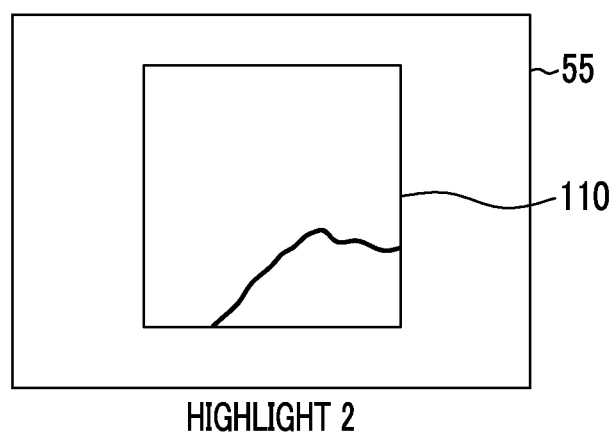

FIG. 5(A) shows highlight 1. In the highlight 1 of FIG. 5(A), the specific area 110 in the restored image subjected to the point-image restoration process is shown by a frame 105 on the display unit 55. With the use of the form of the highlight 1, since an area (an area where the restoration strength is great) where the effect of the point-image restoration process is great is highlighted by the frame 105, it is possible to more easily confirm the effect of the point-image restoration process. FIG. 5(B) shows highlight 2. In the highlight 2 of FIG. 5(B), the specific area 110 is enlarged and displayed on the display unit 55. With the use of the form of the highlight 2, it is possible to confirm the effect of the point-image restoration process regarding the specific area 110 in more detail.

Figure 6A:
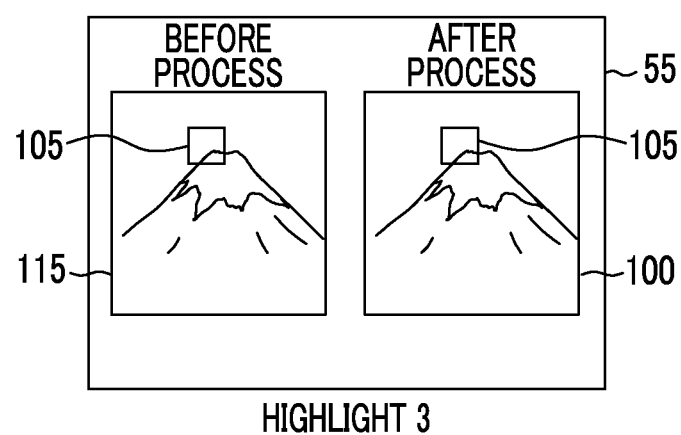
FIGS. 6A and 6B are diagrams illustrating highlighting.

FIG. 6(A) shows highlight 3. In the highlight 3 shown in FIG. 6(A), in a photographic image 115 before the point-image restoration process, an area 120 corresponding to the specific area 110 is shown by the frame 105, and in a restored image 100 after the point-image restoration process, the specific area 110 is shown by the frame 105. In the highlight 3 shown in FIG. 6(A), the entire photographic image 115 and restored image 100 are displayed in parallel for comparison. With the use of the form of the highlight 3, it is possible to more easily confirm the effect of the point-image restoration process of the specific area 110 in the entire image, and since an area where (an area where the restoration strength is great) where the effect of the point-image restoration process is great is highlighted by the frame 105, it is possible to more easily confirm the effect of the point-image restoration process.

Figure 6B:
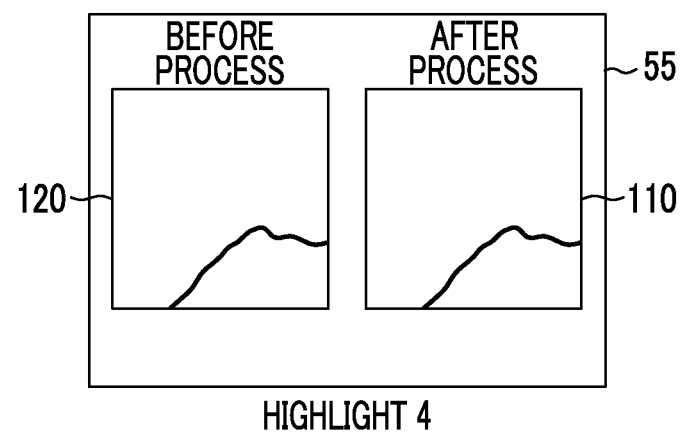

FIG. 6(B) shows highlight 4. In FIG. 6(B), an area 120 corresponding to the specific area 110 of the photographic image before the point-image restoration process is enlarged and the specific area 110 of the restored image 100 after the point-image restoration process is enlarged and shown. With this, it is possible to compare the effect of the point-image restoration process in the specific area 110 in more detail.

As shown in FIG. 6(A) and FIG. 6(B), the display control unit 50 compares and displays the photographic image and the restored image, or the specific area 110 in the restored image and the area in the photographic image corresponding to the specific area 110 on the display unit 55. In this case, the point-image restoration processing unit 40 may subject the photographic image to the point-image restoration process based on a selected image of the compared and displayed images or a selected area of the compared and displayed areas. That is, the photographic image may be subjected to the point-image restoration process having a restoration strength close to that of the point-image restoration process executed for the selected image or the selected area of the compared and displayed areas. For example, when the photographic image before the point-image restoration process is selected, a restoration filter having weak point-image restoration strength is selected, and the photographic image is subjected to the point-image restoration process and displayed for comparison again. The photographic image may be subjected to the point-image restoration process based on a selected image of the compared and displayed images or a selected area. With this, it is possible to allow the user to simply acquire a restored image having restoration strength matching a user's preference.

Figure 7:
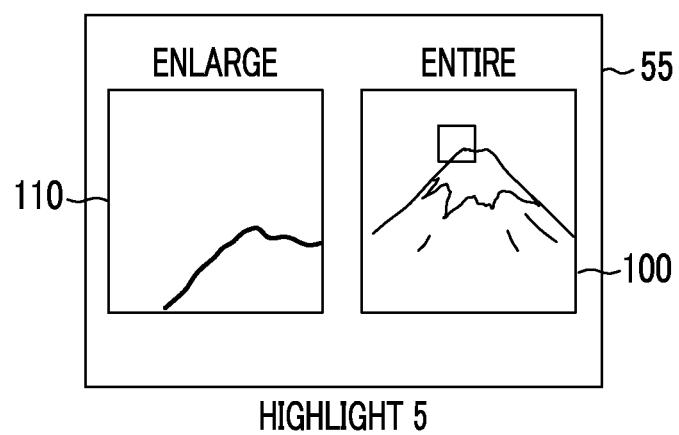
FIG. 7 is a diagram illustrating highlighting.

FIG. 7 shows highlight 5. In the highlight 5, the enlarged specific area 110 in the recovered image 100 and the entire recovered image 100 are arranged so as to be compared with each other. With the use of the form of the highlight 5, it is possible to confirm the effect of the point-image restoration process in more detail at a place where the effect of the point-image restoration process is great, and to confirm the effect of the point-image restoration process in the entire image.

Figure 8:
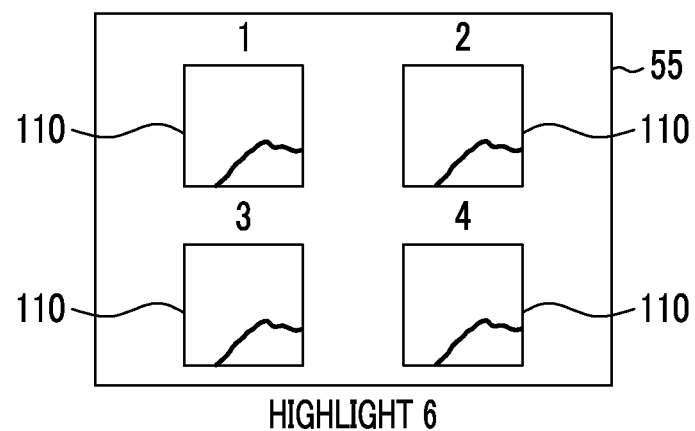
FIG. 8 is a diagram illustrating highlighting.

FIG. 8 shows highlight 6. In the highlight 6, when there are a plurality of specific areas 110 in the restored image, a plurality of specific areas 110 are cut, arranged on the display unit 55, and highlighted. With the use of the form of the highlight 6, even when there are a plurality of specific areas 110 in the restored image, it is possible to confirm the effect of the point-image restoration process in more detail.

Figure 9:
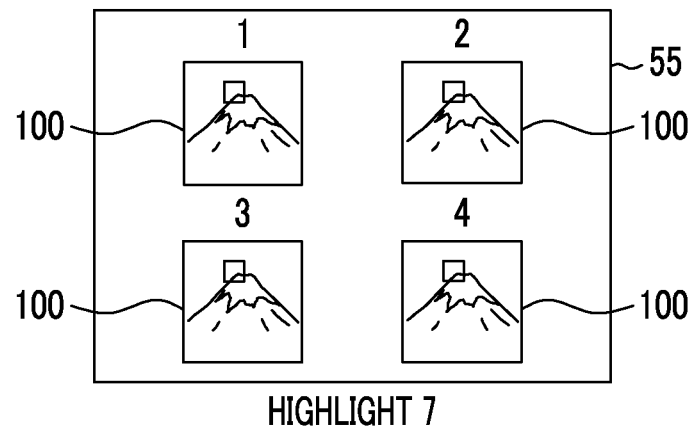
FIG. 9 is a diagram illustrating highlighting.

FIG. 9 shows highlight 7. In the highlight 7, when photographing is performed in a plurality of photographing conditions in a bracketing photographing mode or the like, the frame 105 is displayed on the specific area 110 in each photographing condition, and a restored image on each photographing condition is arranged. With the use of the form of the highlight 7, it is possible to effectively confirm the effect of the point-image restoration process to photographic images photographed with different settings (photographing conditions and the like).

Although the form of highlighting has been described in FIGS. 5 to 9, the invention is not limited thereto. When there are a plurality of specific areas 110 in one restored image, the display control unit 50 can perform display control to highlight the specific areas 110 in the restored image by a plurality of display forms. For example, the display control unit 50 may display the highlight 2 shown in FIG. 5(B) on the display unit 55 regarding a plurality of specific areas 110 while switching sheet by sheet. In this case, the display order is determined based on information relating to the specific area. In addition, the display control unit 50 may perform display on the display unit 55 based on information relating to the specific area in a descending order of the effect of the point-image restoration process as the display order. With this, it is possible to confirm a plurality of highlighted specific areas in a descending order of the effect of the point-image restoration process.

Multiple highlighting may be performed regarding one specific area 110. For example, one specific area 110 may be displayed by the highlight 1 and then highlighted by the highlight 2. In this way, the specific area 110 is displayed by a plurality of forms of highlighting, whereby it is possible to confirm the effect of the point-image restoration process multilaterally.

Display control may be performed such that a place corresponding to an image height at which the specific area 110 is included is highlighted. With this, it is possible to efficiently confirm an area where the effect of the point-image restoration process is great.

Figure 10:
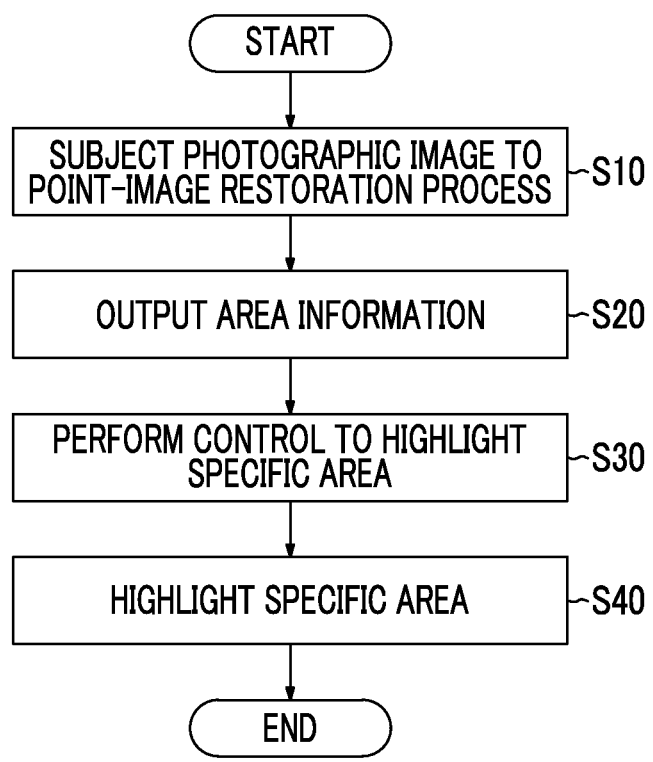
FIG. 10 is a diagram illustrating the operation of the image processing device.

FIG. 10 shows an operation flow of the image processing device 1. First, the photographic image is subjected to the point-image restoration process based on the point-image restoration information by the point-image restoration processing unit 40, and the restored image is generated (Step S10) (point-image restoration processing step). Thereafter, the area information relating to the specific area 110 in the restored image where the restoration strength of the point-image restoration process based on the point-image restoration information is equal to or greater than the threshold value is output by the area information output unit 45 (Step S20) (area information output step).

Thereafter, display control is performed by the display control unit 50 such that the specific area 110 in the restored image is highlighted based on the area information (Step S30) (display control step). Thereafter, in the display unit 55, at least the specific area 110 is highlighted based on the display control (Step S40) (display step).

With the use of the above-described aspect, it is possible to easily confirm the effect of the point-image restoration process by highlighting the specific area 110, and even when there is noise or the like (saturated pixel or the like) in a photographic image before the point-image restoration process, the specific area 110 is specified by the restoration strength; therefore, it is possible to appropriately confirm the effect of the point-image restoration process.

Modification Example 1 of Image Processing Device

Figure 11:
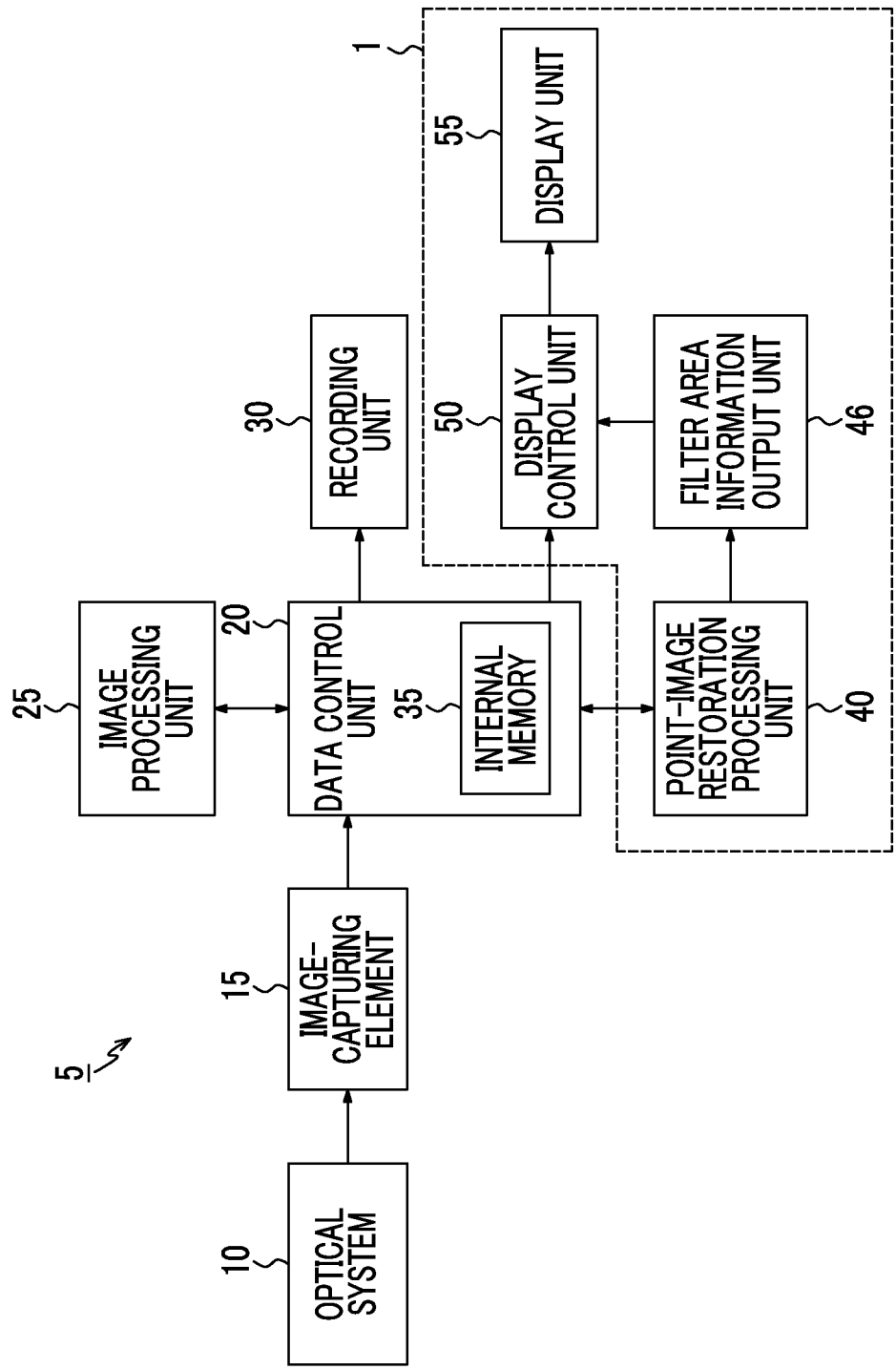
FIG. 11 is a block diagram showing main parts of an image-capturing device including a modification example of an image processing device.

FIG. 11 is a block diagram showing main parts of Modification Example 1 of the image processing device 1. When comparing the image processing device 1 shown in FIG. 1 and the image processing device 1 shown in FIG. 11, the image processing device 1 shown in FIG. 11 has a filter area information output unit 46 instead of the area information output unit 45 in the image processing device 1 shown in FIG. 1. Hereinafter, the image processing device 1 shown in FIG. 11 will be described in detail. The same main parts as those in FIG. 1 are represented by the same reference numerals, and description thereof will not be repeated.

The filter area information output unit 46 receives information relating to the restoration filter of the point-image restoration process as input and outputs filter area information relating to the specific area 110 in the restored image based on information relating to the restoration filter. Information relating to the restoration filter of the point-image restoration process means a design value of the restoration filter which is one factor determining the restoration strength of the point-image restoration process.

Figure 12:
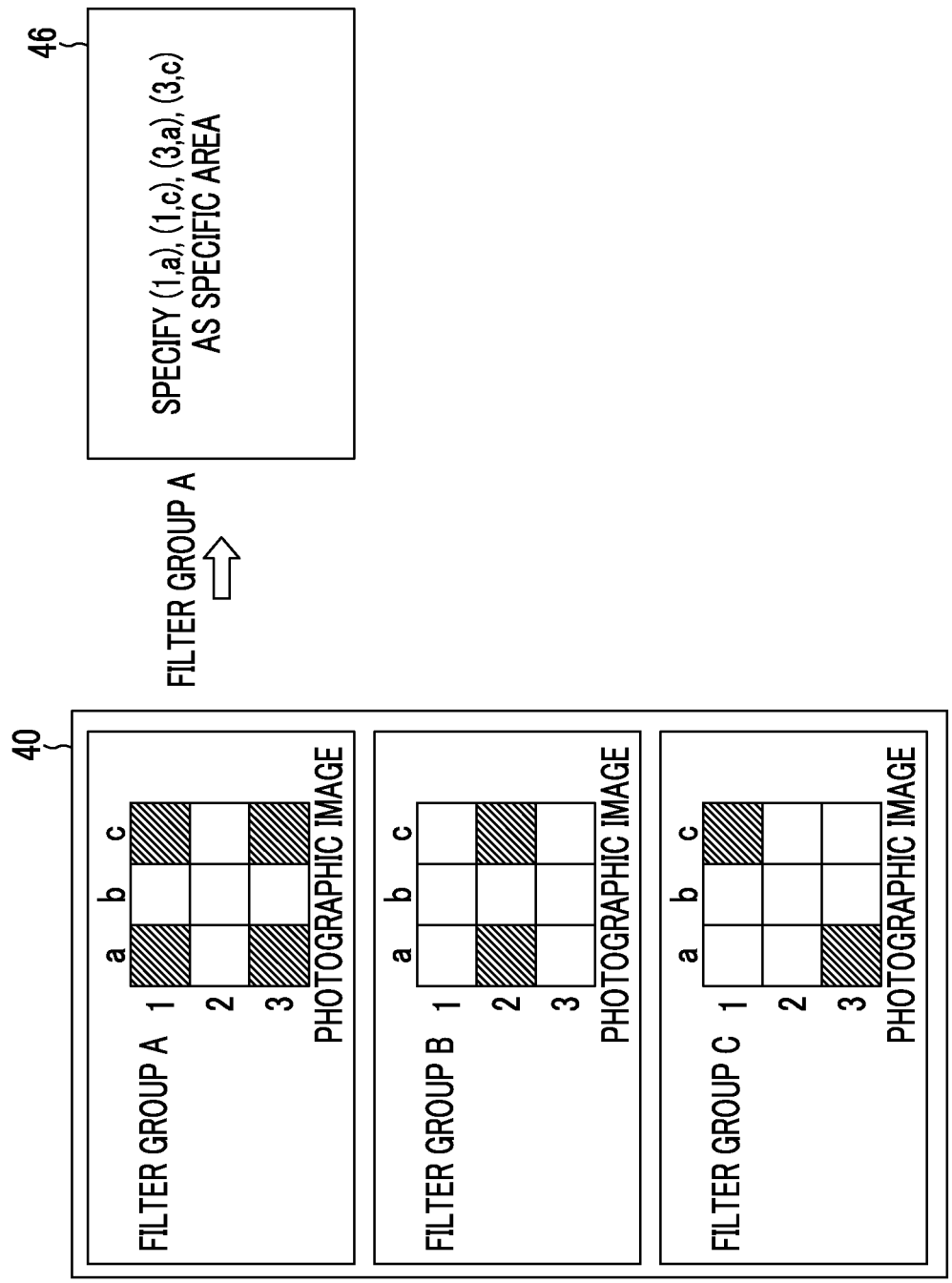
FIG. 12 is a diagram illustrating a modification example of an image processing device.

The filter area information output unit 46 may acquire information relating to the restoration filter described in FIG. 12 from the point-image restoration processing unit 40. FIG. 12 shows that the point-image restoration processing unit 40 has filter groups A, B, and C as point-image restoration information. The point-image restoration processing unit 40 selects one of the retained filter groups A, B, and C and performs the point-image restoration process using the selected filter group. For example, when the filter group A is selected, the point-image restoration process is executed on the areas (1,a), (1,c), (3,a), and (3,c) of the photographic image such that the restoration strength becomes strong (the effect becomes great), that is, as described above, the restoration strength becomes greater than a certain threshold value. In other words, the filter group A and the filters constituting the filter group A are designed such that the point-image restoration process of strong restoration strength is performed on the areas (1,a), (1,c), (3,a), and (3,c) of the photographic image.

Similarly, when the filter group B is selected, the point-image restoration process is executed on the areas (2,a) and (2,c) of the photographic image such that the restoration strength becomes strong (the effect becomes great), that is, as described above, the restoration strength becomes greater than a certain threshold value, and when the filter group C is selected, the point-image restoration process is executed on the areas (3,a) and (1,c) of the photographic image such that the restoration strength becomes strong (the effect becomes great), that is, as described above, the restoration strength becomes greater than a certain threshold value. Accordingly, in a case described in FIG. 12, information relating to the filter group used by the point-image restoration processing unit 40 becomes information relating to the restoration filter.

The point-image restoration processing unit 40 sends information relating to the restoration filter to the filter area information output unit 46. As shown in FIG. 12, for example, when the point-image restoration processing unit 40 uses the filter group A, the point-image restoration processing unit 40 transmits information relating to the filter group A to the filter area information output unit 46.

The filter area information output unit 46 receives information relating to the filter group A as information relating to the restoration filter, and outputs, based on information relating to the restoration filter, the filter area information relating to the specific area 110 in the restored image where the restoration strength is equal to or greater than the threshold value. In the case shown in FIG. 12, the filter area information output unit 46 outputs the filter area information based on information of the filter group A. In this case, the filter area information is information for specifying the areas (1,a), (1,c), (3,a), and (3,c) of the restored image as the specific area 110. The filter area information is transmitted to the display control unit 50. In the description of FIG. 12, although the filter groups A, B, and C are illustratively shown, these are only illustrative for description, and the invention is not limited thereto.

In this way, information relating to the specific area 110 is output based on information set in advance regarding the content of the point-image restoration process, whereby it is possible to appropriately confirm the effect of the point-image restoration process.

Figure 13:
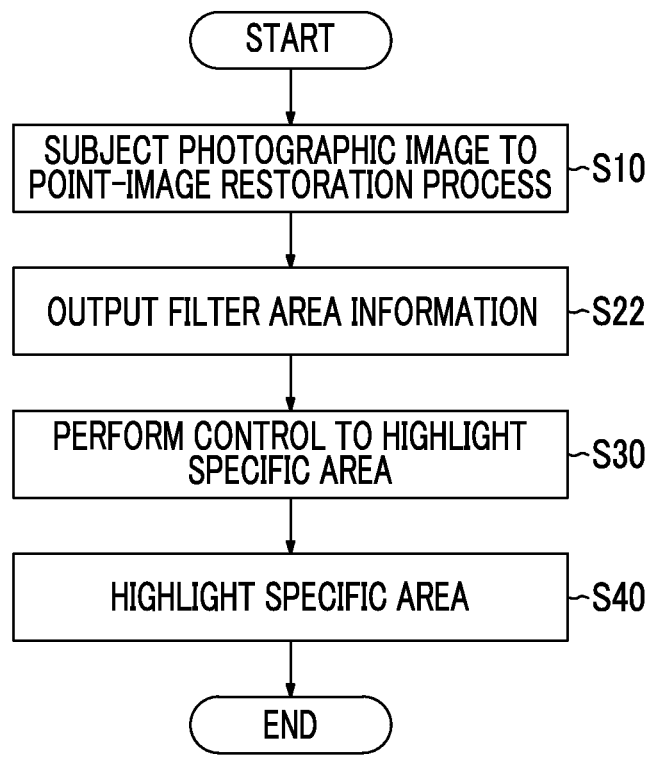
FIG. 13 is a diagram illustrating the operation of a modification example of an image processing device.

FIG. 13 is a flowchart showing an operation in Modification Example 1 of the image processing device 1 shown in FIG. 11. When comparing the operation flowchart shown in FIG. 13 and the operation flowchart shown in FIG. 10, there is a difference in that the operation flowchart shown in FIG. 13 has outputting the filter area information (Step S22) instead of outputting the area information (Step S20). The same steps as those in FIG. 10 are represented by the same reference numerals, and description thereof will not be repeated.

In Modification Example 1 of the image processing device 1 shown in FIG. 13, first, the point-image restoration process is performed by the point-image restoration processing unit 40 and the restored image is generated. Thereafter, the filter area information relating to the specific area 110 in the restored image is output based on information relating to the restoration filter of the point-image restoration process by the filter area information output unit 46 (Step S22) (filter area information output step). Thereafter, display control is performed by the display control unit 50 such that the specific area 110 in the restored image is highlighted based on the filter area information (Step S30) (display control step). Thereafter, in the display unit 55, at least the specific area 110 is highlighted based on the display control (Step S40) (display step).

With the use of the above-described aspect, it is possible to highlight the specific area 110 based on the filter area information and to appropriately confirm the effect of the point-image restoration process.

Modification Example 2 of Image Processing Device

Figure 14:
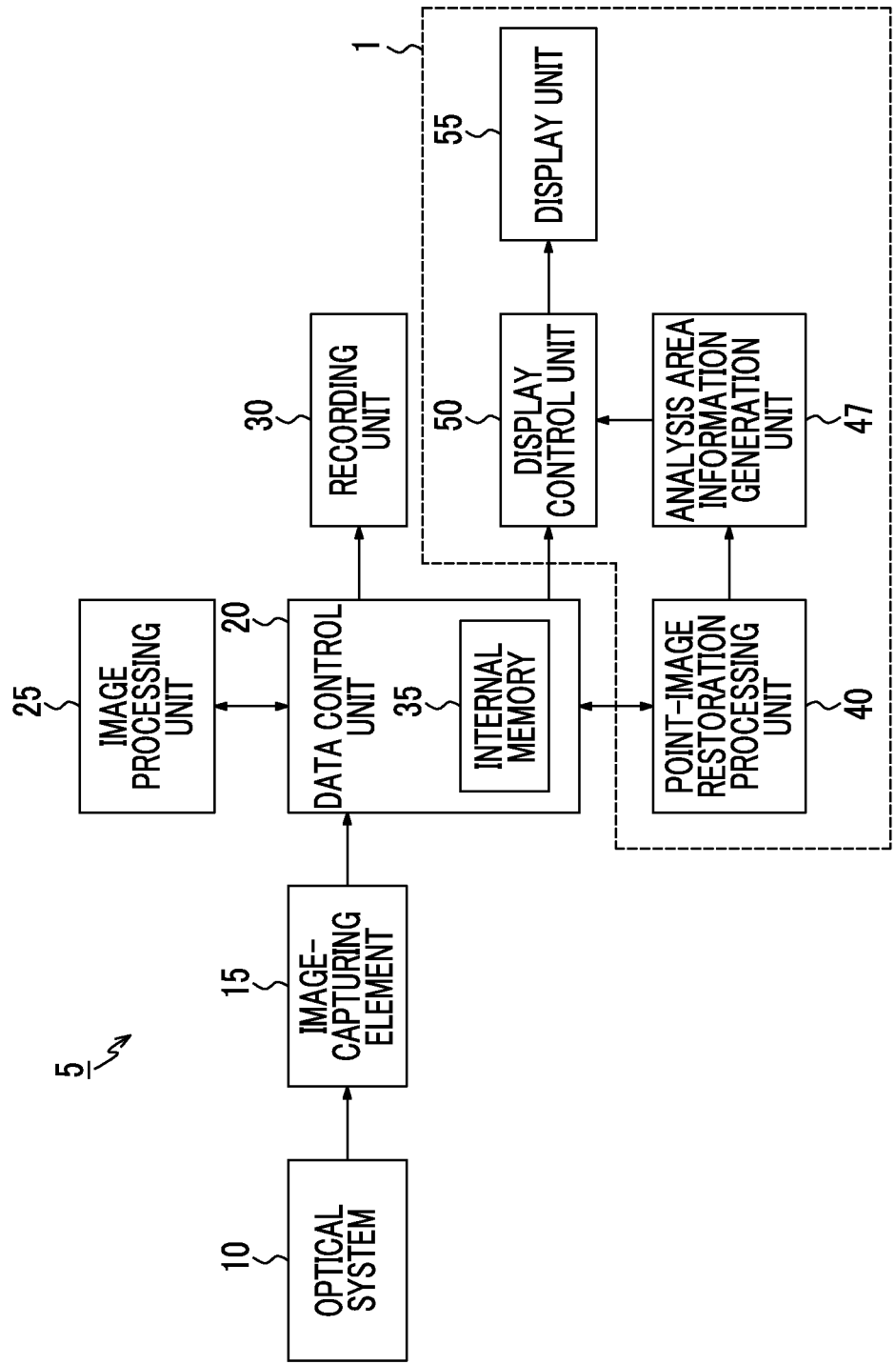
FIG. 14 is a block diagram showing main parts of an image-capturing device including a modification example of an image processing device.

FIG. 14 is a block diagram showing main parts of Modification Example 2 of the image processing device 1. When comparing the image processing device 1 shown in FIG. 1 and the image processing device 1 shown in FIG. 14, the image processing device 1 shown in FIG. 14 has an analysis area information generation unit 47 instead of the area information output unit 45 in the image processing device 1 shown in FIG. 1. Hereinafter, Modification Example 2 of the image processing device 1 shown in FIG. 14 will be described in detail. The same main parts as those in FIG. 1 are represented by the same reference numerals, and description thereof will not be repeated.

The analysis area information generation unit 47 acquires the photographic image retained in the data control unit 20, analyzes and specifies an area where a false signal is likely to occur in the photographic image, sets the area as the specific area 110, and generates the analysis area information. That is, the analysis area information generation unit 47 acquires the photographic image before the point-image restoration process retained in the data control unit 20, analyzes the photographic image, and specifies (estimates) an area where a false signal occurs when the point-image restoration process is performed. In regard to the area where a false signal is likely to occur, for example, an area where there is a saturated pixel is specified as the area where a false signal is likely to occur. This is because a false signal, such as ringing, occurs if the point-image restoration process is performed on the area in the photographic image where there is a saturated pixel. For example, during a demosaic process (synchronization process) which is performed by the image processing unit 25, an area where edge determination is erroneously performed due to the influence of chromatic aberration or the like is specified as an area where a false signal is likely to occur. That is, while color shift occurs due to the influence of chromatic aberration in the edge portion in the photographic image, the demosaic process may be performed in the edge portion where such chromatic aberration occurs, and a false signal in which an originally linear edge portion is an uneven shape may occur. Such an area is specified as an area where a false signal is likely to occur. For example, an area where a designed restoration filter is not in an assumed state is specified as an area where a false signal is likely to occur when the point-image restoration process is performed.

The analysis area information generated by the analysis area information generation unit 47 is sent to the display control unit 50. The display control unit 50 performs display control to highlight the specific area 110 in the restored image based on the analysis area information.

In this way, the characteristic of the photographic image before the point-image restoration process is analyzed and information relating to the specific area 110 is output based on information set in advance, whereby it is possible to appropriately confirm the effect of the point-image restoration process.

Figure 15:
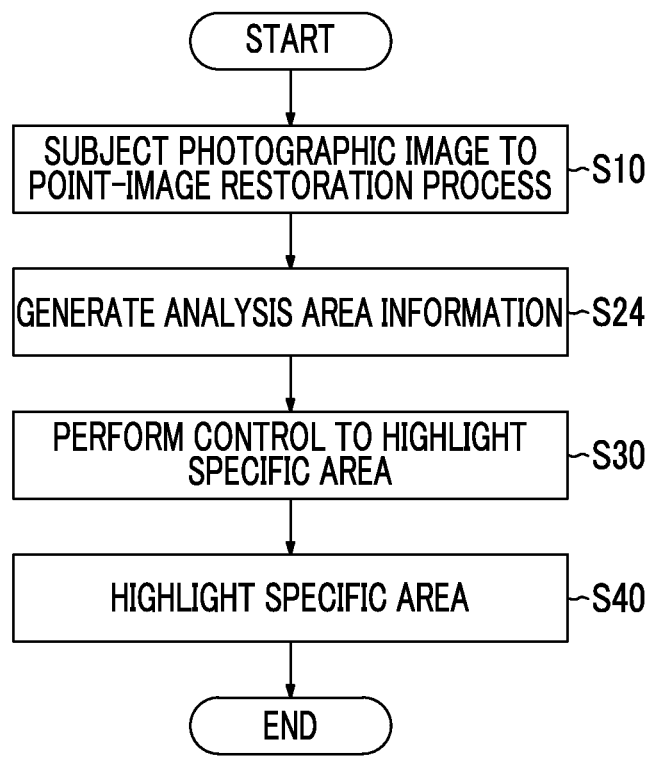
FIG. 15 is a diagram illustrating the operation of a modification example of an image processing device.

FIG. 15 is a flowchart showing an operation in Modification Example 2 of the image processing device 1 shown in FIG. 14. When comparing the operation flowchart shown in FIG. 15 and the operation flowchart shown in FIG. 10, there is a difference in that the operation flowchart shown in FIG. 15 has outputting the analysis area information (Step S24) instead of outputting the area information (Step S20). The same steps as those in FIG. 10 are represented by the same reference numerals, and description thereof will not be repeated.

The point-image restoration process is performed by the point-image restoration processing unit 40, and the restored image is generated. Thereafter, the analysis area information relating to the specific area 110 in the restored image is generated based on information relating to the restoration filter of the point-image restoration process by the analysis area information generation unit 47 (Step S24) (analysis area information generation step). Thereafter, display control is performed by the display control unit 50 such that the specific area 110 in the restored image is highlighted based on the analysis area information (Step S30) (display control step). Thereafter, in the display unit 55, at least the specific area 110 is highlighted based on the display control (Step S40) (display step).

With the use of the above-described aspect, it is possible to highlight the specific area 110 based on the analysis area information and to appropriately confirm the effect of the point-image restoration process.

Modification Example 3 of Image Processing Device

FIG. 16 is a block diagram showing main parts of Modification Example 3 of the image processing device 1. When comparing the image processing device 1 shown in FIG. 1 and the image processing device 1 shown in FIG. 16, the image processing device 1 shown in FIG. 16 has a photographing condition area information output unit 48 instead of the area information output unit 45 in the image processing device 1 shown in FIG. 1. Hereinafter, Modification Example 3 of the image processing device 1 shown in FIG. 16 will be described in detail. The same main parts as those in FIG. 1 are represented by the same reference numerals, and description thereof will not be repeated.

The photographing condition area information output unit 48 receives information relating to the photographing conditions of the photographic image from the optical system 10 as input and outputs photographing condition area information relating to the specific area 110 in the photographic image based on information relating to the photographing conditions. Information relating to the photographing conditions is, for example, at least one of an F value, a photographing distance, a focal distance, a zoom position, and a lens type. In the example shown in FIG. 16, although a case where information relating to the photographing conditions is acquired from the optical system 10 has been described, the invention is not limited thereto. The photographing condition area information output unit 48 can acquire the photographing conditions from any devices as long as the photographing conditions can be acquired.

In the photographing condition area information output unit 48 which acquires the photographing conditions, the photographing condition area information relating to the specific area 110 is output by the acquired photographing conditions. The photographing condition area information is not particularly limited as long as an area where the point-image restoration process of strong restoration strength is performed is specified according to the photographing conditions.

Figure 17A:
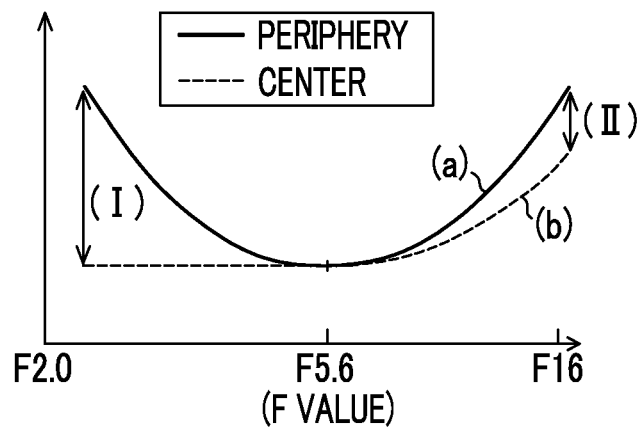
FIGS. 17A to 17C are diagrams illustrating a modification example of an image processing device.
Figure 17B:
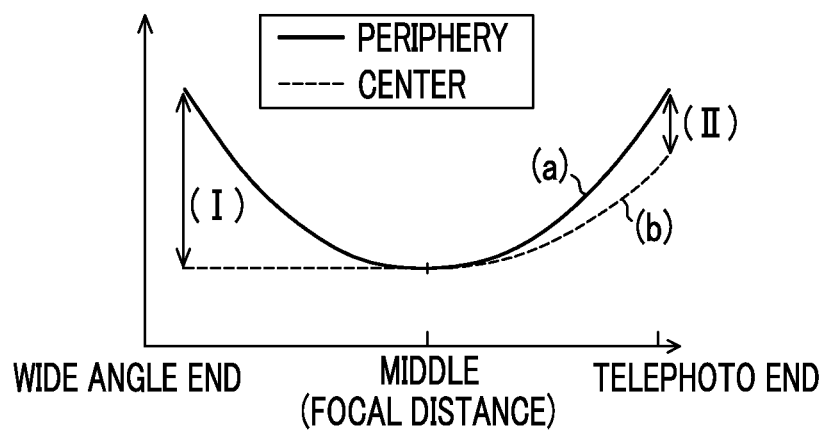
Figure 17C:
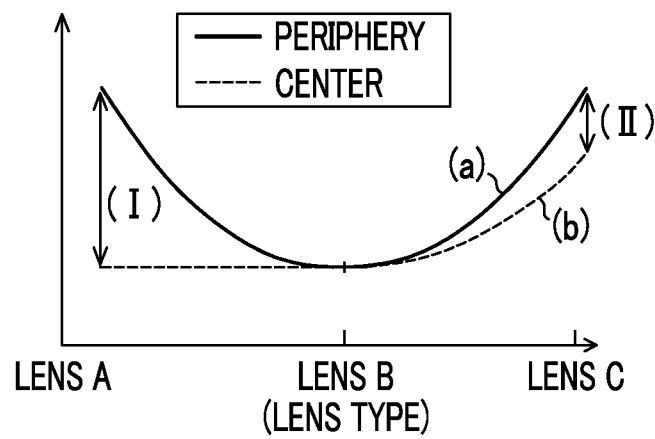

FIGS. 17(A)-17(C) are a diagram showing a specific example where the photographing condition area information output unit 48 acquires information relating to the photographing conditions of the photographic image and outputs the photographing condition area information relating to the specific area 110 in the photographic image. A solid line indicated by (a) in FIGS. 17(A)-17(C) indicates the restoration strength of the point-image restoration process in a peripheral area of the restored image. As shown in FIG. 4, the restoration strength can be represented by, for example, the increase rate of the MTF. A dotted line indicated by (b) in FIGS. 17(A)-17(C) indicates the restoration strength of the point-image restoration process in a central area of the restored image. (I) and (II) in FIGS. 17(A)-17(C) represent the difference in restoration strength between the peripheral area and the central area in the restored image.

FIG. 17(A) shows a case where the F value is acquired as information relating to the photographing conditions. As described in FIG. 17(A), when information showing that the F value is set to 2.0 and the photographic image is acquired is obtained, the difference between the restoration strength in the central area of the restored image and the restoration strength in the periphery becomes (I). As described in FIG. 17(A), when the F value is set to 16 and the photographic image is acquired, the difference between the restoration strength in the central area of the restored image and the restoration strength in the periphery becomes (II). When the F value is set to 5.6 around an intermediate value and the photographic image is acquired, there is almost no difference between the restoration strength in the central area of the restored image and the restoration strength in the periphery.

When the F value of 2.0 is acquired as information relating to the photographing conditions, since the difference between the restoration strength in the central area of the restored image and the restoration strength in the periphery is (I), the photographing condition area information output unit 48 highlights the peripheral area. This is because it is possible to effectively confirm the effect of the point-image restoration process by highlighting the peripheral area of great restoration strength since the restoration strength in the periphery of the restored image is greater than the restoration strength at the center by a given value or more.

When the F value of 16 is acquired as information relating to the photographing conditions, since the difference between the restoration strength in the central area of the restored image and the restoration strength in the periphery is (II), the photographing condition area information output unit 48 highlights the central area. This is because the central area where there is a high probability that a main object is taken is highlighted since the difference between the restoration strength in the periphery of the restored image and the restoration strength at the center is less than a given value.

When the F value of 5.6 is acquired as information relating to the photographing conditions, since there is almost no difference between the restoration strength in the central area of the restored image and the restoration strength in the periphery, the photographing condition area information output unit 48 highlights the central area. This is because the central area where there is a high probability that a main object is taken is highlighted since the difference between the restoration strength in the periphery of the restored image and the restoration strength at the center is less than a given value.

That is, in the specific example shown in FIG. 17(A), when the difference between the restoration strength in the central area of the restored image and the restoration strength in the periphery is equal to or greater than a given value (when the F value is 2.0), in order to accurately confirm a great effect of the point-image restoration process, the peripheral area of great restoration strength is highlighted. When the difference between the restoration strength in the central area of the restored image and the restoration strength in the periphery is less than a given value (when the F value is 16), in order to confirm the effect of the point-image restoration process in the main object, the central area where there is a high probability that the main object is taken is displayed.

In FIG. 17(B), a case where the photographing condition area information output unit 48 acquires the focal distance as information relating to the photographing conditions is described. In the specific example shown in FIG. 17(B), when the difference between the restoration strength in the central area of the restored image and the restoration strength in the periphery is equal to or greater than a given value (when the focal distance is a wide angle end and the difference of the restoration strength is (I)), in order to accurately confirm a great effect of the point-image restoration process, the peripheral area of great restoration strength is highlighted. When the difference between the restoration strength in the central area of the restored image and the restoration strength in the periphery is less than a given value (when the focal distance is a telephoto end and the difference of the restoration strength is (II)), in order to confirm the effect of the point-image restoration process in the main object, the central area where there is a high probability that the main object is taken is displayed. When there is almost no difference between the restoration strength in the central area of the restored image and the restoration strength in the periphery (when the focal distance is middle), in order to confirm the effect of the point-image restoration process in the main object, the central area where there is a high probability that the main object is taken is displayed. The wide angle end means that the focal distance is on the most wide angle side in a zoom lens, and the telephoto end means that the focal distance is on the most telephone side in a zoom lens.

In FIG. 17(C), a case where the photographing condition area information output unit 48 acquires the type of lens to be used as information relating to the photographing conditions is described. In the specific example shown in FIG. 17(C), when the difference between the restoration strength in the central area of the restored image and the restoration strength in the periphery is equal to or greater than a given value (when a lens A is used and the difference of the restoration strength is (I)), in order to accurately confirm a great effect of the point-image restoration process, the peripheral area of great restoration strength is highlighted. When the difference between the restoration strength in the central area of the restored image and the restoration strength in the periphery is less than a given value (when a lens C is used and the difference of the restoration strength is (II)), in order to confirm the effect of the point-image restoration process in the main object, the central area where there is a high probability that the main object is taken is displayed. When there is almost no difference between the restoration strength in the central area of the restored image and the restoration strength in the periphery (when a lens B is used), in order to confirm the effect of the point-image restoration process in the main object, the central area where there is a high probability that the main object is taken is displayed.

As the specific example of Modification Example 3 of the image processing device 1, although a case where the F value, the focal distance, or the lens type is acquired as information relating to the photographing conditions has been described, the invention is not limited thereto. For example, a zoom position, a photographing distance, and the like can be information relating to the photographing conditions.

In this way, information relating to the specific area 110 is output based on information set in advance regarding the content of the point-image restoration process, whereby it is possible to appropriately confirm the effect of the point-image restoration process.

Figure 18:
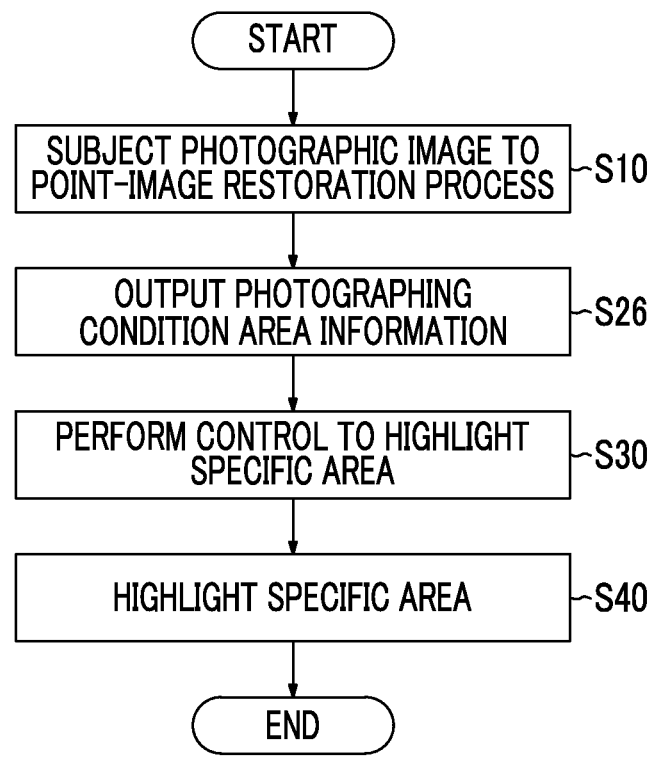
FIG. 18 is a diagram illustrating the operation of a modification example of an image processing device.

FIG. 18 is a flowchart showing an operation in Modification Example 3 of the image processing device 1 shown in FIG. 16. When comparing the operation flowchart shown in FIG. 18 and the operation flowchart shown in FIG. 10, there is a difference in that the operation flowchart shown in FIG. 18 has outputting the photographing condition area information (Step S26) instead of outputting the area information (Step S20). The same steps as those in FIG. 10 are represented by the same reference numerals, and description thereof will not be repeated.

The point-image restoration process is performed by the point-image restoration processing unit 40, and the restored image is generated. Thereafter, the photographing condition area information relating to the specific area 110 in the photographic image is output based on information relating to the photographing conditions of the photographic image by the analysis area information generation unit 47 (Step S26) (photographing condition area information output step). Thereafter, display control is performed by the display control unit 50 such that the specific area 110 in the restored image is highlighted based on the photographing condition area information (Step S30) (display control step). Thereafter, in the display unit 55, at least the specific area 110 is highlighted based on the display control (Step S40) (display step).

With the use of the above-described aspect, the photographing condition area information relating to the specific area where the restoration strength is equal to or greater than the threshold value is output based on information relating to the photographing conditions, whereby it is possible to highlight the specific area 110 based on the photographing condition area information and to appropriately confirm the effect of the point-image restoration process.

Modification Example 4 of Image Processing Device

Figure 19:
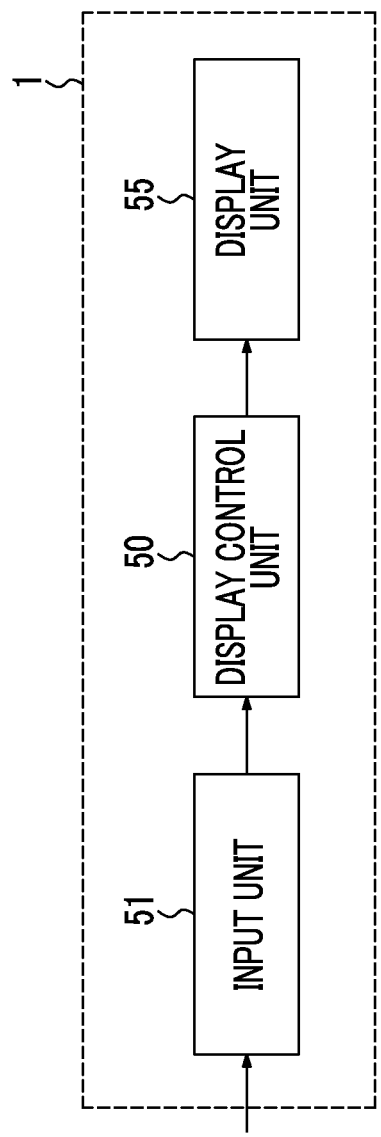
FIG. 19 is a block diagram showing main parts of an image-capturing device including a modification example of an image processing device.

FIG. 19 is a block diagram showing main parts of Modification Example 4 of the image processing device 1. Modification Example 4 of the image processing device 1 shown in FIG. 19 primarily includes an input unit 51, a display control unit 50, and a display unit 55. The same main parts as those in FIG. 1 are represented by the same reference numerals, and description thereof will not be repeated.

The restored image obtained by subjecting the photographic image to the point-image restoration process based on the point-image restoration information and the area information relating to the specific area 110 in the restored image where the restoration strength of the point-image restoration process based on the point-image restoration information is equal to or greater than the threshold value are input to the input unit 51. Specifically, a form in which the area information is attached to the restored image input to the input unit 51 is considered. For example, a case where the area information is recorded in a tag of an exchange image file format (Exif) and input to the input unit 51 along with the restored image is considered. A case where the area information is attached to the restored image in other devices (personal computer or digital camera) in which the point-image restoration process is performed is considered.

Although a case where the area information is attached as information attached to the recovered image 100 has been described, the invention is not particularly limited thereto, and the point-image restoration information may be attached to the recovered image 100. In this case, Modification Example 4 of the image processing device 1 further has the area information output unit 45.

The display control unit 50 performs display control to highlight the restored image based on the area information input to the input unit 51. A case where Modification Example 4 of the image processing device 1 is included in, for example, viewer software of an image-capturing device (digital camera) is considered.

Figure 20:
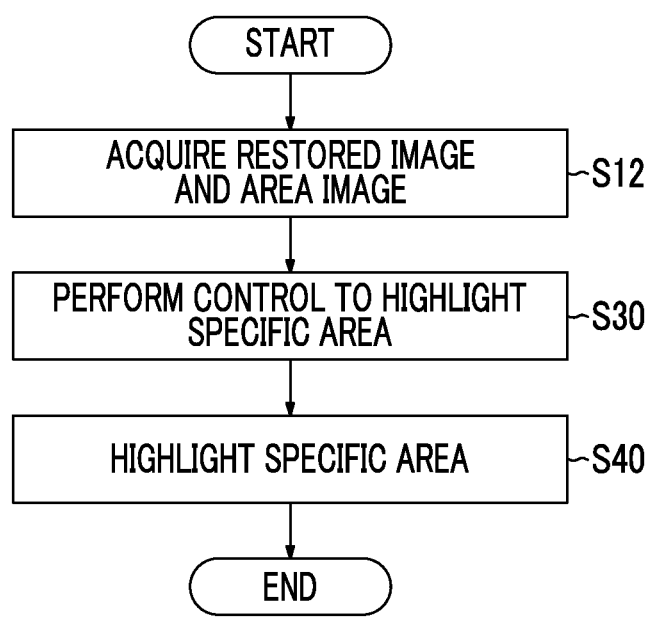
FIG. 20 is a diagram illustrating the operation of a modification example of an image processing device.

FIG. 20 is a flowchart showing an operation in Modification Example 4 of the image processing device 1 shown in FIG. 19. When comparing the operation flowchart shown in FIG. 20 and the operation flowchart shown in FIG. 10, there is a difference in that the operation flowchart shown in FIG. 20 does not have subjecting the photographic image to the point-image restoration process (Step S10) and outputting the area information (Step S20) of FIG. 10. There is a difference in that the operation flowchart shown in FIG. 20 has acquiring the restored image and the area information (Step S12) (acquisition step). The same steps as those in FIG. 10 are represented by the same reference numerals, and description thereof will not be repeated.

The restored image and the area information are acquired by the input unit 51 (Step S12) (acquisition step). Thereafter, the display control is performed by the display control unit 50 such that the specific area 110 in the restored image is highlighted based on the area information (Step S30) (display control step). Thereafter, in the display unit 55, at least the specific area 110 is highlighted based on the display control (Step S40) (display step).

With the use of the above-described aspect, it is possible to perform highlighting in a restored image subjected to the point-image restoration process in another device and to appropriately confirm the effect of the point-image restoration process.

Hitherto, for convenience of description, the expression that the image processing device 1 has the filter area information output unit 46 instead of the area information output unit 45, the expression that the image processing device 1 has the analysis area information generation unit 47 instead of the area information output unit 45, or the expression that the image processing device 1 has the photographing condition area information output unit 48 instead of the area information output unit 45 has been used. However, the image processing device 1 can have an arbitrary combination of the area information output unit 45, the filter area information output unit 46, the analysis area information generation unit 47, and the photographing condition area information output unit 48.

<Application Example to EDoF System>

Although the point-image restoration process using the parameters of the point-image restoration process in the above description is an image process for recovering and correcting point spread (point image blur) according to a specific photographing condition (for example, a diaphragm value, a focal distance, a lens type, or the like) to restore an original object image, an image process to which the invention can be applied is not limited to the point-image restoration process in the embodiments described above. For example, the point-image restoration process and the display control according to the invention can also be applied to a point-image restoration process on image data photographed and acquired by an image-capturing device with an optical system having an extended depth of field (focus) (EDoF). Image data of a blurred image photographed and acquired in a state where the depth of field (depth of focus) is extended by the EDoF optical system is subjected to the point-image restoration process, whereby image data of high resolution in a focused state over a wide range can be restored and generated. In this case, the restoration process is performed using a restoration filter based on a point spread function (PSF, OTF, MTF, PTF, or the like) of the EDoF optical system and having a filter coefficient set such that satisfactory image restoration can be performed within a range of an extended depth of field (a depth of focus).

Hereinafter, an example of a system (EDoF system) relating to restoration of image data photographed and acquired through the EDoF optical system will be described. In an example described below, a luminance signal (luminance signal Y) which is obtained from image data (RGB data) after a demosaic process is subjected to a point-image restoration process.

Figure 21:
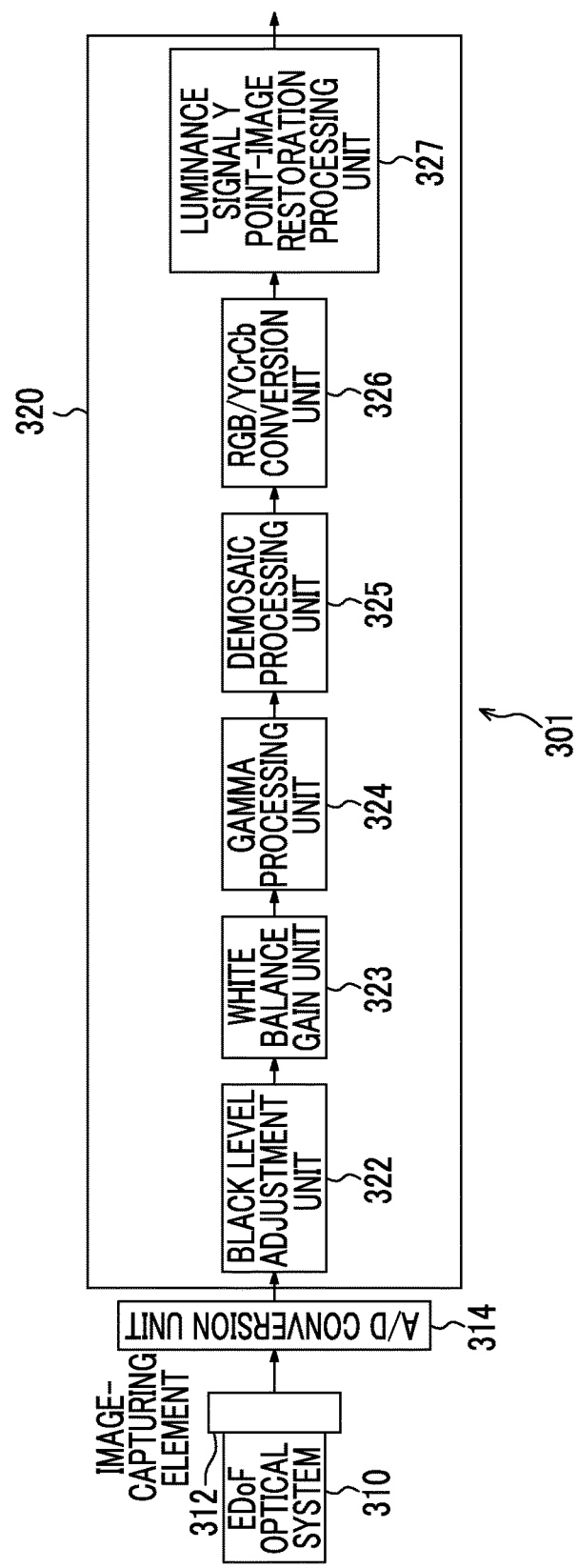
FIG. 21 is a block diagram showing a form of an image-capturing module including an EDoF optical system.

FIG. 21 is a block diagram showing a form of an image-capturing module 301 including an EDoF optical system. The image-capturing module (digital camera or the like) 301 of this example includes an EDoF optical system (lens unit) 310, an image-capturing element 312, an AD conversion unit 314, and a point-image restoration processing block (image processing unit) 320.

Figure 22:
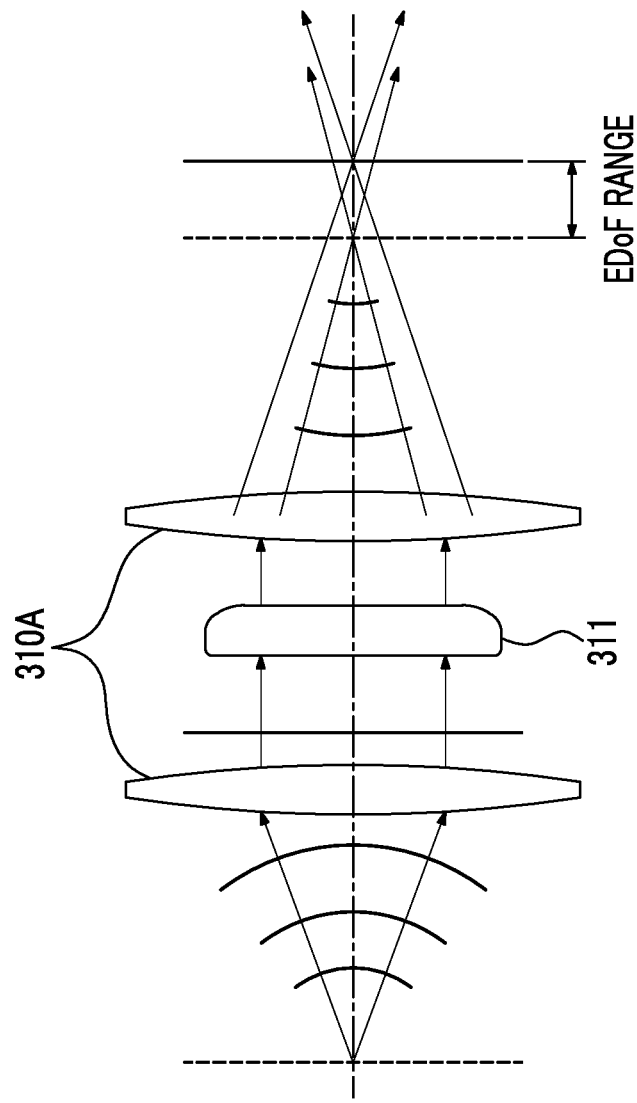
FIG. 22 is a diagram showing an example of the EDoF optical system.

FIG. 22 is a diagram showing an example of an EDoF optical system 310. The EDoF optical system 310 of this example has a single-focus fixed photographing lens 310A, and an optical filter 311 which is arranged at a pupil position. The optical filter 311 modulates a phase, and makes the EDoF optical system 310 (photographing lens 310A) have an extended depth of field such that an extended depth of field (depth of focus) (EDoF) is obtained. In this way, the photographing lens 310A and the optical filter 311 constitute a photographing lens unit which modulates a phase to extend a depth of field.

The EDoF optical system 310 includes other components as necessary, and for example, a diaphragm (not shown) is provided near the optical filter 311. The optical filter 311 may be one sheet or may be constituted by combining a plurality of sheets. The optical filter 311 is only an example of optical phase modulation means, and the EDoF of the EDoF optical system 310 (photographing lens 310A) may be implemented by other means. For example, instead of providing the optical filter 311, the EDoF of the EDoF optical system 310 may be implemented by the photographing lens 310A designed to have the same function as the optical filter 311 of this example.

That is, the EDoF of the EDoF optical system 310 can be implemented by various means for changing the wavefront of imaging on the light receiving surface of the image-capturing element 312. For example, "an optical element with a variable thickness", "an optical element with a variable refractive index (a refractive index distribution type wavefront modulation lens or the like)", "an optical element with a variable thickness or refractive index coating on the lens surface or the like (a wavefront modulation hybrid lens, an optical element formed on the lens surface as a phase plane, or the like)", or "a liquid crystal element capable of modulating a phase distribution of light (a liquid crystal spatial phase modulation element or the like)" may be used as EDoF means of the EDoF optical system 310. In this way, the invention can be applied to not only a case where formation of images to be regularly dispersed can be performed by an optical wavefront modulation element (optical filter 311 (phase plate)), but also a case where the same dispersed images as the case of using the optical wavefront modulation element can be formed by the photographing lens 310A itself without using the optical wavefront modulation element.

The EDoF optical system 310 shown in FIG. 22 can be reduced in size since a focus adjustment mechanism which performs focus adjustment mechanically can be omitted, and can be suitably mounted in a camera-equipped mobile phone or a mobile information terminal.

An optical image after passing through the EDoF optical system 310 having the EDoF is formed on the image-capturing element 312 shown in FIG. 21 and is converted to an electrical signal here.

The image-capturing element 312 is constituted of a plurality of pixels arranged in a matrix in a predetermined pattern array (Bayer array, G stripe R/G full checkered pattern, X-Trans array, honeycomb array, or the like), and each pixel includes a microlens, a color filter (in this example, an RGB color filter), and a photodiode. An optical image incident on the light receiving surface of the image-capturing element 312 through the EDoF optical system 310 is converted to a signal charge in the amount according to the amount of incident light by each photodiode arranged on the light receiving surface. The signal charges of R, and B accumulated in each photodiode are sequentially output as a voltage signal for each pixel, that is, an image signal.

The AD conversion unit 314 converts the analog R, and B image signals output from the image-capturing element 312 for each pixel to digital RGB image signals. The digital image signals converted to the digital image signals by the AD conversion unit 314 are applied to the point-image restoration processing block 320.

The point-image restoration processing block 320 includes, for example, a black level adjustment unit 322, a white balance gain unit 323, a gamma processing unit 324, a demosaic processing unit 325, an RGB/YCrCb conversion unit 326, and a luminance signal Y point-image restoration processing unit 327.

The black level adjustment unit 322 subjects the digital image signals output from the AD conversion unit 314 to black level adjustment. For the black level adjustment, a known method may be used. For example, when focusing on a certain effective photoelectric conversion element, the average of signals for dark current amount acquisition corresponding to a plurality of OB photoelectric conversion elements included in a photoelectric conversion element line including the effective photoelectric conversion element is determined, and the black level adjustment is performed by subtracting the average from the signal for dark current amount acquisition corresponding to the effective photoelectric conversion element.

The white balance gain unit 323 performs gain adjustment according to a white balance gain of each of the color signals of RGB included in the digital image signals with adjusted black level data.

The gamma processing unit 324 performs gamma correction to perform gradation correction, such as halftone, such that the R, G, and B image signals subjected to the white balance adjustment have desired gamma characteristics.

The demosaic processing unit 325 subjects the R, G, and B image signals after gamma correction to a demosaic process. Specifically, the demosaic processing unit 325 subjects the R, G, and B image signals to a color interpolation process to generate a set of image signals (R signal, G signal, and B signal) output from the respective light receiving pixels of the image-capturing element 312. That is, although a pixel signal from each light receiving pixel is one of the R, G, and B image signals before color demosaic process, a set of three pixel signals of R, G, and B signals corresponding to each light receiving pixel is output after color demosaic process.

The RGB/YCrCb conversion unit 326 converts the R, G, and B signals of each pixel subjected to the demosaic process to a luminance signal Y and color difference signals Cr and Cb and outputs the luminance signal Y and the color difference signals Cr and Cb of each pixel.

The luminance signal Y point-image restoration processing unit 327 subjects the luminance signal Y output from the RGB/YCrCb conversion unit 326 to a point-image restoration process based on a restoration filter stored in advance. The restoration filter is constituted of, for example, a deconvolution kernel (corresponding to the number of taps of M=7 and N=7) having a kernel size of 7×7, and a calculation coefficient (corresponding to restoration gain data, filter coefficient) corresponding to the deconvolution kernel, and is used for a deconvolution process (reverse convolution calculation process) of phase modulation of the optical filter 311. For the restoration filter, one corresponding to the optical filter 311 is stored in a memory (not shown) (for example, a memory incidentally attached with the luminance signal Y point-image restoration processing unit 327). The kernel size of the deconvolution kernel is not limited to 7×7.

Figure 23:
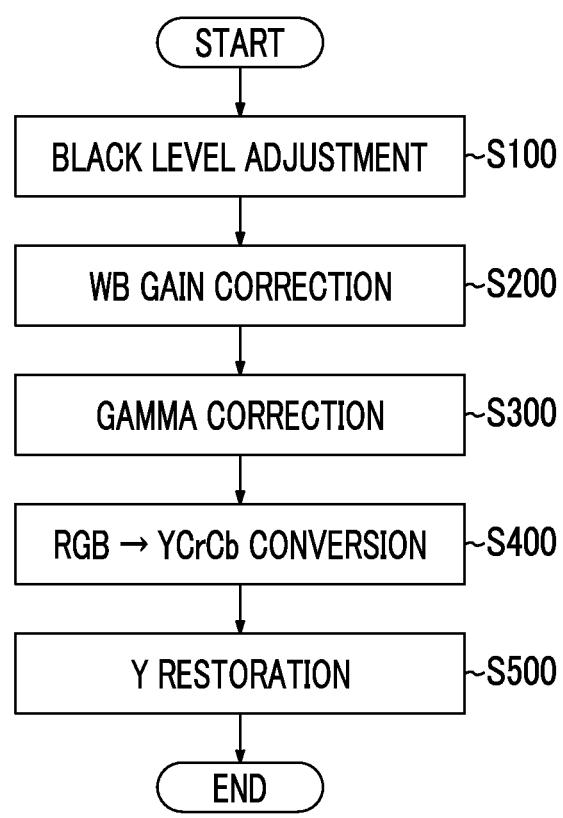
FIG. 23 is a flowchart showing an example of a restoration process in a restoration processing block shown in FIG. 21.

Next, the point-image restoration process in the point-image restoration processing block 320 will be described. FIG. 23 is a flowchart showing an example of the point-image restoration process in the point-image restoration processing block 320 shown in FIG. 21.

The digital image signal is applied from the AD conversion unit 314 to one input of the black level adjustment unit 322, black level data is applied to the other input of the black level adjustment unit 322, and the black level adjustment unit 322 subtracts black level data from the digital image signal and outputs the digital image signal with black level data subtracted to the white balance gain unit 323 (Step S100). With this, no black level component is included in the digital image signal, and a digital image signal indicating a black level becomes 0.

Image data after the black level adjustment is sequentially subjected to the processes by the white balance gain unit 323 and the gamma processing unit 324 (Steps S200 and S300).

The R, G, and B signals subjected to gamma correction are subjected to the demosaic process in the demosaic processing unit 325 and are then converted to the luminance signal Y and the color difference signals Cr and Cb in the RGB/YCrCb conversion unit 326 (Step S400).

The luminance signal Y point-image restoration processing unit 327 subjects the luminance signal Y to the point-image restoration process to apply the deconvolution process of phase modulation of the optical filter 311 of the EDoF optical system 310 (Step S500). That is, the luminance signal Y point-image restoration processing unit 327 performs the deconvolution process (reverse convolution calculation process) of a luminance signal (in this case, a luminance signal of 7×7 pixels) corresponding to a pixel group of a predetermined unit centering on an arbitrary pixel to be processed and the restoration filter (the 7×7 deconvolution kernel and the calculation coefficient) stored in the memory or the like in advance. The luminance signal Y point-image restoration processing unit 327 performs the point-image restoration process for removing image blur of the entire image by repeating the deconvolution process of each pixel group of the predetermined unit so as to cover the entire area of the image-capturing surface. The restoration filter is determined according to the position of the center of the pixel group subjected to the deconvolution process. That is, the common restoration filter is applied to adjacent pixel groups. In addition, in order to simplify the point-image restoration process, it is preferable to apply the common restoration filter to all pixel groups.

Figure 24:
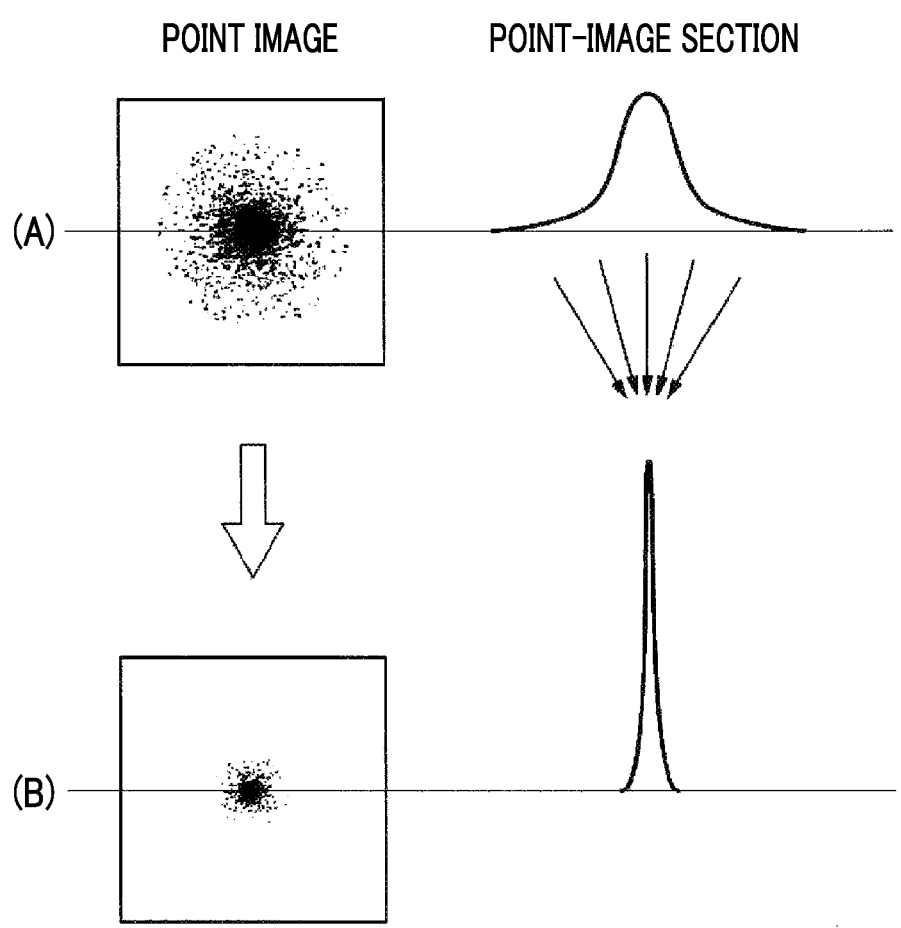
FIG. 24 is a diagram showing a state of a point image restored by the point-image restoration process.

As described above, in an application example to the EDoF system, similarly, as shown in FIG. 24(A), a point image (optical image) of the luminance signal after passing through the EDoF optical system 310 is formed on the image-capturing element 312 as a great point image (blurred image), but is restored to a small point image (image of high resolution) by the deconvolution process in the luminance signal Y point-image restoration processing unit 327 as shown in FIG. 24(B).

As described above, the point-image restoration process is applied to the luminance signal after the demosaic process, whereby it is not necessary to separately provide the parameters of the point-image restoration process for RGB, and it is possible to accelerate the point-image restoration process. Furthermore, instead of putting together the R, G, and B image signals corresponding the R, G, and B pixels at discrete positions in one unit and performing the deconvolution process, the luminance signals of adjacent pixels are put together in a predetermined unit and the common restoration filter is applied to this unit and the deconvolution process is performed; therefore, the accuracy of the point-image restoration process is improved. In regard to the color difference signals Cr and Cb, resolution does not need to be increased by the point-image restoration process in terms of image quality because of the visual characteristic of human eyes. Furthermore, when recording an image in a compression format, such as JPEG, the color difference signals are compressed at a higher compression rate than the luminance signal; therefore, there is less necessity to increase resolution by the point-image restoration process. Consequently, it is possible to achieve improvement of restoration accuracy and simplification and acceleration of the process. In regard to the display control, the display control described in the respective embodiments of the invention can be applied.

The point-image restoration process and the display control according to the respective embodiments of the invention can also be applied to the point-image restoration process of the EDoF system described above.

Other Embodiments in Image-Capturing Device

Although a digital camera has been described as the embodiment of the image-capturing device 5 including the image processing device 1 of the invention, the configuration of the image capturing device is not limited thereto. Other photographing devices of the invention include, for example, an embedded or external PC camera or a mobile terminal device having a photographing function described below can be used.

As a mobile terminal device which is an embodiment of the photographing device 5 of the invention, for example, mobile phones, smartphones, personal digital assistants (PDAs), portable game machines, and the like are given. Hereinafter, for example, a smartphone will be described in detail referring to the drawings.

Figure 25:
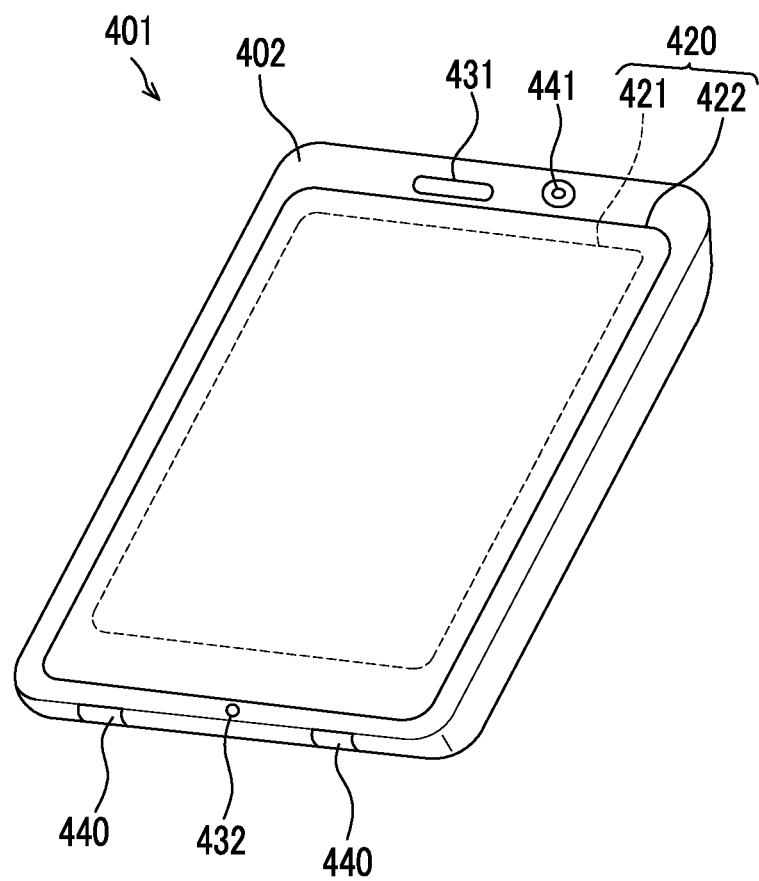
FIG. 25 is a diagram showing another aspect of an image-capturing device.

FIG. 25 shows the appearance of a smartphone 401 which is an embodiment of a photographing device of the invention. The smartphone 401 shown in FIG. 25 has a flat plate-like housing 402, and includes, on one surface of the housing 402, a display input unit 420 in which a display panel 421 as a display unit 55 and an operation panel 422 as an input unit are integrated. The housing 402 includes a speaker 431, a microphone 432, an operating unit 440, and a camera unit 441. The configuration of the housing 402 is not limited thereto, and for example, a configuration in which a display unit 55 and an input unit are separated can be used, or a configuration in which a folding structure or a slide mechanism is provided can be used.

Figure 26:
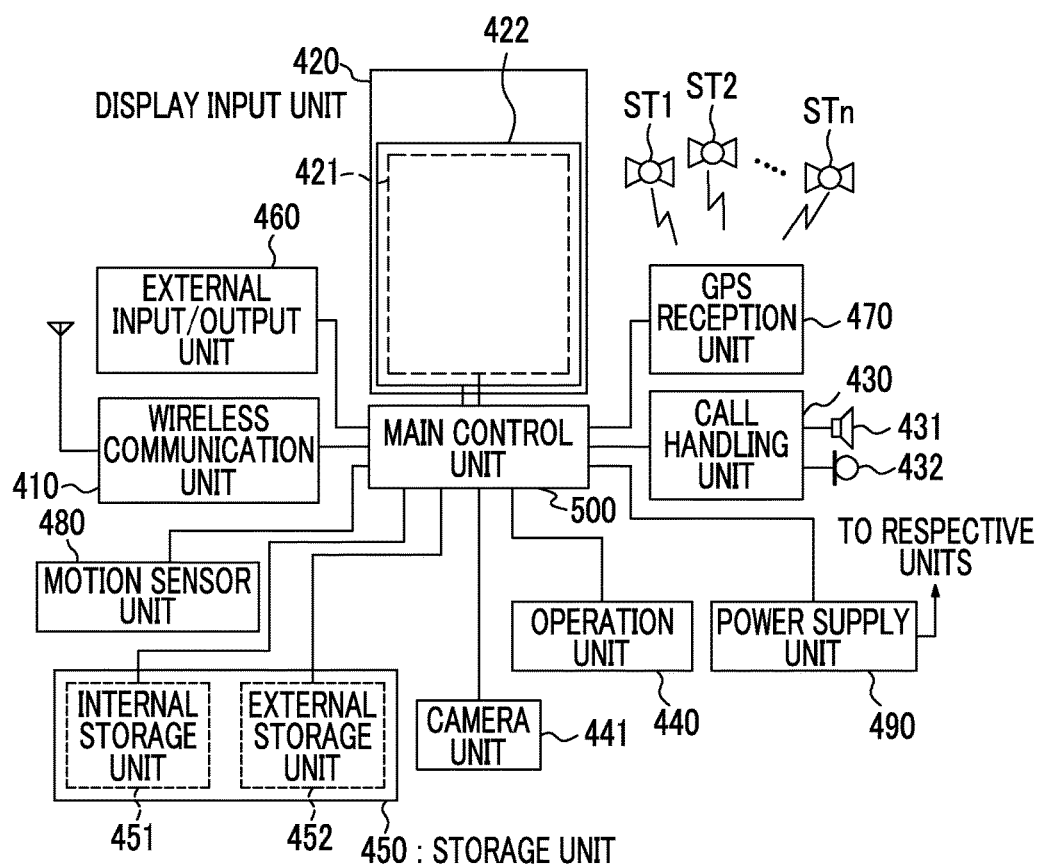
FIG. 26 is a block diagram showing the configuration of the image-capturing device shown in FIG. 25.

FIG. 26 is a block diagram showing the configuration of the smartphone 401 shown in FIG. 25. As shown in FIG. 26, the smartphone includes, as major components, a wireless communication unit 410, a display input unit 420, a call handling unit 430, an operating unit 440, a camera unit 441, a storage unit 450, an external input/output unit 460, a global positioning system (GPS) reception unit 470, a motion sensor unit 480, a power supply unit 490, and a main control unit 500. The smartphone 401 has, as a major function, a wireless communication function of performing mobile wireless communication through a base station device BS and a mobile communication network NW.

The wireless communication unit 410 performs wireless communication with the base station device BS in the mobile communication network NW according to an instruction of the main control unit 500. Transmission/reception of various kinds of file data, such as speech data or image data, electronic mail data, and the like, or reception of Web data, streaming data, or the like is performed using wireless communication.

The display input unit 420 is a so-called touch panel which displays images (still image and moving image), character information, or the like under the control of the main control unit 500 to visually transfer information to the user and detects a user's operation on the displayed information, and includes the display panel 421 and the operation panel 422.

The display panel 421 uses, for example, a liquid crystal display (LCD) or an organic electro-luminescence display (OELD), as a display device. The operation panel 422 is a device which is placed such that an image displayed on the display surface of the display panel 421 is visible, and detects one or a plurality of operation coordinates with the finger of the user or a stylus. If the device is operated with the finger of the user or the stylus, a detection signal generated due to the operation is output to the main control unit 500. Next, the main control unit 500 detects the operation position (coordinates) on the display panel 421 based on the received detection signal.

As shown in FIG. 25, the display panel 421 and the operation panel 422 of the smartphone 401 illustrated as an embodiment of a photographing device of the invention are integrated to constitute the display input unit 420, and the operation panel 422 is arranged so as to completely cover the display panel 421. When this arrangement is used, the operation panel 422 may have a function of detecting a user's operation in an area outside the display panel 421. In other words, the operation panel 422 may include a detection area (hereinafter, referred to as a display area) for a superimposed portion overlapping the display panel 421 and a detection area (hereinafter, referred to as a non-display area) for an outer edge portion not overlapping the display panel 421.

Although the size of the display area may completely match the size of the display panel 421, both do not necessarily match each other. The operation panel 422 may include two sensitive areas of an outer edge portion and an inside portion. In addition, the width of the outer edge portion is appropriately designed according to the size of the housing 402 or the like. Furthermore, as a position detection system which is used in the operation panel 422, a matrix switch system, a resistive film system, a surface acoustic wave system, an infrared system, an electromagnetic induction system, an electrostatic capacitance system, or the like is given, and any system can be used.

The call handling unit 430 includes a speaker 431 and a microphone 432, converts speech of the user input through the microphone 432 to speech data processable in the main control unit 500 and outputs speech data to the main control unit 500, or decodes speech data received by the wireless communication unit 410 or the external input/output unit 460 and outputs speech from the speaker 431. As shown in FIG. 25, for example, the speaker 431 can be mounted on the same surface as the surface on which the display input unit 420 is provided, and the microphone 432 may be mounted on the side surface of the housing 402.

The operating unit 440 is a hardware key, such as a key switch, and receives an instruction from the user. For example, as shown in FIG. 25, the operating unit 440 is a push button-type switch which is mounted on the side surface of the housing 402 of the smartphone 401, and is turned on when pressed with a finger or the like and is turned off by a restoration force of a spring or the like if the finger is released.

The storage unit 450 stores a control program or control data of the main control unit 500, application software, address data in association with the name, telephone number, and the like of a communication partner, data of transmitted and received electronic mail, Web data downloaded by Web browsing, downloaded content data, or temporarily stores streaming data or the like. The storage unit 450 is constituted of an internal storage unit 451 embedded in the smartphone and an external storage unit 452 which has a detachable external memory slot. The internal storage unit 451 and the external storage unit 452 constituting the storage unit 450 are implemented using a memory (for example, MicroSD (Registered Trademark) memory or the like) of a flash memory type, a hard disk type, a multimedia card micro type, or a card type, or a recording medium, such as a random access memory (RAM) or a read only memory (ROM).

The external input/output unit 460 plays a role of an interface with all external devices connected to the smartphone 401, and is provided for direct or indirect connection to other external devices by communication or the like (for example, universal serial bus (USB), IEEE1394 or the like), or a network (for example, Internet, wireless LAN, Bluetooth (Registered Trademark), radio frequency identification (RFID), infrared data association (IrDA) (Registered Trademark), ultra wideband (UWB) (Registered Trademark), ZigBee (Registered Trademark), or the like).

The external device connected to the smartphone 401 is, for example, a wired or wireless headset, a wired or wireless external charger, a wired or wireless data port, a memory card connected through a card socket, a subscriber identity module card (SIM)/user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone, or the like. The external input/output unit can transfer data transmitted from the external devices to the respective components in the smartphone 401, or can transmit data in the smartphone 401 to the external devices.

The GPS reception unit 470 receives GPS signals transmitted from GPS satellites ST1 to STn according to an instruction of the main control unit 500, executes a positioning calculation process based on a plurality of received GPS signals, and detects the position of the smartphone 401 having latitude, longitude, and altitude. When positional information can be acquired from the wireless communication unit 410 or the external input/output unit 460 (for example, wireless LAN), the GPS reception unit 470 may detect the position using the positional information.

The motion sensor unit 480 includes, for example, a three-axis acceleration sensor or the like, and detects physical motion of the smartphone 401 according to an instruction of the main control unit 500. The moving direction or acceleration of the smartphone 401 can be detected by detecting physical motion of the smartphone 401. The detection result is output to the main control unit 500.

The power supply unit 490 supplies power stored in a battery (not shown) to the respective units of the smartphone 401 according to an instruction of the main control unit 500.

The main control unit 500 includes a microprocessor, operates according to the control program or control data stored in the storage unit 450, and integrally controls the respective units of the smartphone 401. The main control unit 500 has a mobile communication control function of controlling the respective units of a communication system in order to perform speech communication or data communication through the wireless communication unit 410, and an application processing function.

The application processing function is implemented by the main control unit 500 operating according to application software stored in the storage unit 450. The application processing function is, for example, an infrared communication function of controlling the external input/output unit 460 to perform data communication with a device facing the smartphone 401, an electronic mail function of transmitting and receiving electronic mail, a Web browsing function of browsing Web pages, or the like.

The main control unit 500 has an image processing function of displaying video on the display input unit 420, or the like based on image data (still image or moving image data), such as received data or downloaded streaming data. The image processing function refers to a function of the main control unit 500 decoding image data, subjecting the decoding result to an image process, and displaying an image on the display input unit 420.

The main control unit 500 executes display control on the display panel 421, and operation detection control for detecting a user's operation through the operating unit 440 and the operation panel 422.

With the execution of the display control, the main control unit 500 displays an icon for activating application software or a software key, such as a scroll bar, or displays a window for creating electronic mail. The scroll bar refers to a software key for receiving an instruction to move a display portion of an image which is too large to fit into the display area of the display panel 421.

With the execution of the operation detection control, the main control unit 500 detects a user's operation through the operating unit 440, receives an operation on the icon or an input of a character string in an entry column of the window through the operation panel 422, or receives a scroll request of a display image through the scroll bar.

With the execution of the operation detection control, the main control unit 500 has a touch panel control function of determining whether an operation position on the operation panel 422 is in the superimposed portion (display area) overlapping the display panel 421 or the outer edge portion (non-display area) not overlapping the display panel 421, and controlling the sensitive area of the operation panel 422 or the display position of the software key.

The main control unit 500 may detect a gesture operation on the operation panel 422 and may execute a function set in advance according to the detected gesture operation. The gesture operation is not a conventional simple touch operation, and means an operation to render a track with a finger or the like, an operation to simultaneously designate a plurality of positions, or an operation to render a track for at least one of a plurality of positions by combining these operations.

The camera unit 441 is a digital camera which electronically captures an image using an image-capturing element, such as a complementary metal oxide semiconductor (CMOS) or a charge-coupled device (CCD). The camera unit 441 can convert image data obtained by image capturing to compressed image data of, for example, a joint photographic coding experts group (JPEG) format and can record image data in the storage unit 450 under the control of the main control unit 500. Furthermore, the camera unit 441 can output image data through the external input/output unit 460 or the wireless communication unit 410. As shown in FIG. 25, in the smartphone 401, the camera unit 441 is mounted on the same surface of the display input unit 420; however, the mounting position of the camera unit 441 is not limited thereto, and the camera unit 441 may be mounted on the rear surface of the display input unit 420, or a plurality of camera units 441 may be mounted. When a plurality of camera units 441 are mounted, the camera unit 441 which is used to capture an image is switched from one to another and captures an image alone, or a plurality of camera units 441 are simultaneously used to capture images.

The camera unit 441 is used for various functions of the smartphone 401. For example, an image acquired by the camera unit 441 can be displayed on the display panel 421, or an image in the camera unit 441 can be used as one operation input on the operation panel 422. When the GPS reception unit 470 detects the position, the position may be detected with reference to an image from the camera unit 441. In addition, the optical axis direction of the camera unit 441 of the smartphone 401 or the current use environment may be determined with reference to the image from the camera unit 441 without using the three-axis acceleration sensor, or using the three-axis acceleration sensor. Of course, an image from the camera unit 441 may be used in application software.

In addition, image data of a still image or a moving image can be attached with positional information acquired by the GPS reception unit 470, speech information (which may be text information through speech-text conversion by the main control unit or the like) acquired by the microphone 432, posture information acquired by the motion sensor unit 480, or the like and may be recorded in the storage unit 450 or may be output through the input/output unit 460 or the wireless communication unit 410.

The invention can be achieved by reading a program code (program) for realizing the procedure of the flow shown in the above-described embodiments stored in a recording medium and executing the program code with a system or a computer (or CPU and MPU) of the device.

In this case, the program code read from the recording medium itself realizes the functions of the above-described embodiments. For this reason, the program code and the computer-readable recording medium which stores and records the program code also constitute the embodiment of the invention.

A recording medium for supplying the program code includes a Floppy (Registered Trademark) disk, a hard disk, an optical disc, a magneto-optical disk, a CD-ROM, a CD-R, a magnetic tape, a nonvolatile memory card, and a ROM.

The functions of the above-described embodiments are realized when the read program is executed by a computer. In addition, the execution of the program includes a case where an OS running on the computer performs the entire or a part of an actual process based on an instruction from the program.

The functions of the above-described embodiments may be realized by a function expansion board inserted in a computer or a function expansion unit connected to a computer. In this case, the program read from the recording medium is first written in a memory in the function expansion board inserted in the computer or the function expansion unit connected to the computer. Thereafter, a CPU in the function expansion board or the function expansion unit performs the entire or a part of an actual process based on an instruction from the program. The functions of the above-described embodiments are also realized by a process of the function expansion board or the function expansion unit.

The respective steps of the flow of the above-described embodiments are not limited to being realized using software (computer), and may be realized using hardware (electronic circuits).

EXPLANATION OF REFERENCES

1: image processing device
10: optical system
15: image-capturing element
20: data control unit
25: image processing unit
30: recording unit
35: internal memory
40: point-image restoration processing unit
45: area information output unit
46: filter area information output unit
47: analysis area information generation unit
48: photographing condition area information output unit
50: display control unit
51: input unit
55: display unit
100: recovered image
105: frame
110: specific area
301: image-capturing module
310: EDoF optical system
310A: photographing lens
401: smartphone
421: display panel
422: operation panel
500: main control unit

What is claimed is:

1. An image processing device comprising:
a microprocessor configured to:
receive a photographic image as input, and subject the photographic image to a point-image restoration process based on point-image restoration information to generate a restored image,
generate area information relating to a specific area in the restored image where restoration strength of the point-image restoration process based on the point-image restoration information is equal to or greater than a threshold value, and
perform display control to highlight the specific area in the restored image based on the area information; and
a display unit which highlights at least the specific area based on the display control by the microprocessor.

2. The image processing device according to claim 1, wherein an area in the restored image where an increase rate of a modulation transfer function based on the point-image restoration information is equal to or greater than a threshold value is selected as the specific area.

3. An image processing device comprising:
a microprocessor configured to:
receive a photographic image as input, and subject the photographic image to a point-image restoration process based on point-image restoration information to generate a restored image,
generate filter area information relating to the specific area in the restored image based on information relating to a restoration filter of the point restoration process, and
perform display control to highlight the specific area in the restored image based on the filter area information; and
a display unit which highlights at least the specific area based on the display control by the microprocessor.

4. An image processing device comprising:
a microprocessor configured to:
receive a photographic image as input, and subject the photographic image to a point-image restoration process based on point-image restoration information to generate a restored image,
analyze and specify an area where a false signal is likely to occur in the photographic image, and generate analysis area information for setting the area as the specific area,
perform display control to highlight the specific area in the restored image based on the analysis area information; and
a display unit which highlights at least the specific area based on the display control by the microprocessor.

5. An image processing device comprising:
a microprocessor configured to:
receive a photographic image as input, and subject the photographic image to a point-image restoration process based on point-image restoration information to generate a restored image;
generate photographing condition area information relating to the specific area in the photographic image based on information relating to the photographing conditions of the photographic image; and
perform display control to highlight the specific area in the restored image based on the photographing condition area information.

6. The image processing device according to claim 5, wherein the photographing condition area information relating to the specific area in the photographic image is generated based on at least one of an F value, a photographing distance, a focal distance, a zoom position, and a lens type.

7. The image processing device according to claim 1,
wherein the microprocessor performs display control to highlight the specific area in the restored image in a plurality of display forms, and a display order of the plurality of display forms is determined based on information relating to the specific area.

8. The image processing device according to claim 1,
wherein the microprocessor performs display control to highlight a central area of the restored image when there is no specific area, and
the display unit highlights the central area of the restored image based on the display control by the microprocessor.

9. The image processing device according to claim 1,
wherein the microprocessor performs display control to display the specific area in the restored image and the restored image, and
the display unit displays the specific area in the restored image and the restored image based on the display control by the microprocessor.

10. The image processing device according to claim 1,
wherein the microprocessor performs display control to compare and display the photographic image and the restored image or the specific area in the restored image and an area in the photographic image corresponding to the specific area,
the display unit compares and displays the photographic image and the restored image or the specific area in the restored image and an area in the photographic image corresponding to the specific area based on the display control by the microprocessor, and
the microprocessor subjects the photographic image to the point-image restoration process based on a selected image of the compared and displayed images or a selected area of the compared and displayed areas.

11. The image processing device according to claim 1,
wherein the microprocessor performs display control to highlight a location corresponding to an image height at which the specific area is included.

12. An image-capturing device comprising:
the image processing device according to claim 1.

13. The image-capturing device according to claim 12,
wherein the image-capturing device is a lens interchangeable type.

14. The image-capturing device according to claim 12,
wherein the image-capturing device has a lens which modulates a phase to extend a depth of field.

15. An image processing device comprising:
a microprocessor configured to:
receive, as input, a restored image obtained by subjecting a photographic image to a point-image restoration process based on point-image restoration information and area information relating to a specific area in the restored image where restoration strength of the point-image restoration process based on the point-image restoration information is equal to or greater than a threshold value, and
perform display control to highlight the specific area in the restored image based on the area information; and
a display unit which highlights at least the specific area based on the display control by the microprocessor.

16. An image processing method comprising:
a point-image restoration processing step of subjecting a photographic image to a point-image restoration process based on point-image restoration information and generating a restored image;
an area information output step of outputting area information relating to a specific area in the restored image where restoration strength of the point-image restoration process based on the point-image restoration information is equal to or greater than a threshold value;
a display control step of performing display control to highlight the specific area in the restored image based on the area information; and
a display step of highlighting at least the specific area based on the display control in the display control step.

17. An image processing method comprising:
an acquisition step of acquiring a restored image obtained by subjecting a photographic image to a point-image restoration process based on point-image restoration information and area information relating to a specific area in the restored image where restoration strength of the point-image restoration process based on the point-image restoration information is equal to or greater than a threshold value;
a display control step of receiving the restored image and the area information as input and performing display control to highlight the specific area in the restored image based on the area information; and
a display step of highlighting at least the specific area based on the display control in the display control step.

18. A non-transitory computer readable recording medium storing a program which causes a computer to execute:
an acquisition step of acquiring a restored image obtained by subjecting a photographic image to a point-image restoration process based on point-image restoration information and area information relating to a specific area in the restored image where restoration strength of the point-image restoration process based on the point-image restoration information is equal to or greater than a threshold value;
a display control step of receiving the restored image and the area information as input and performing display control to highlight the specific area in the restored image based on the area information; and
a display step of highlighting at least the specific area based on the display control in the display control step.

* * * * *